(12) United States Patent
Firpo et al.

(10) Patent No.: US 11,973,646 B2
(45) Date of Patent: Apr. 30, 2024

(54) SYSTEM AND METHOD FOR ADAPTING WORKFLOWS BASED ON COMMONALITY WITH OTHERS

(71) Applicant: MOTOROLA SOLUTIONS, INC., Chicago, IL (US)

(72) Inventors: Isabel Firpo, Chicago, IL (US); Jonathan Whitall, Naperville, IL (US); Phyllis C Austin, Weston, FL (US); Amruthavarshini Hiriyur Krishnamurthy, Bangalore (IN); Kylene Tanner, Bountiful, UT (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/457,039

(22) Filed: Dec. 1, 2021

(65) Prior Publication Data
US 2023/0171156 A1   Jun. 1, 2023

(51) Int. Cl.
| H04L 41/0859 | (2022.01) |
| G06F 11/30 | (2006.01) |
| H04L 9/40 | (2022.01) |
| H04L 41/06 | (2022.01) |
| H04L 41/0866 | (2022.01) |

(Continued)

(52) U.S. Cl.
CPC ...... *H04L 41/0859* (2013.01); *G06F 11/3065* (2013.01); *H04L 41/06* (2013.01); *H04L 41/0866* (2013.01); *H04L 63/20* (2013.01); *H04L 67/30* (2013.01); *H04L 67/535* (2022.05); *H04L 67/60* (2022.05)

(58) Field of Classification Search
CPC . H04L 41/0859; H04L 41/06; H04L 41/0866; H04L 63/20; H04L 67/30; H04L 67/535; H04L 67/60; G06F 11/3065
See application file for complete search history.

(56) References Cited

U.S. PATENT DOCUMENTS 7,216,292 B1 * 5/2007 Snapper ............... G06F 40/174
715/236
7,856,498 B2   12/2010 Hughes et al.
(Continued)

OTHER PUBLICATIONS

Tian, Yong et al.: "Device, System and Method for Modifying Electronic Workflows", Application Serial No. PCT/CN2020/115664, filed: Sep. 16, 2020, all pages.
(Continued)

*Primary Examiner* — Ramy M Osman

(57) ABSTRACT

Techniques for adapting workflows based on commonality with others are provided. It is detected that a workflow server connected to a network is being configured via a user interface to create a workflow. The workflow includes detecting a trigger via a sensor in the network and causing an action to execute at a device in the network in response to the trigger. The workflow being created is compared to a previously created workflow to generate a score that indicates a degree of similarity between the workflow being created and the previously created workflow. Upon verifying that the score satisfies a predefined condition, at least one feature of the previously created workflow that is not currently included in the workflow being created is selected. The user interface is signaled to display an indication to propose that the feature be included in the workflow being created.

19 Claims, 15 Drawing Sheets

(51) Int. Cl.
*H04L 67/30* (2022.01)
*H04L 67/50* (2022.01)
*H04L 67/60* (2022.01)

(56) References Cited

U.S. PATENT DOCUMENTS

| | | | |
|---|---|---|---|
| 8,234,561 B1* | 7/2012 | Bourdev | G06F 40/30 |
| | | | 715/224 |
| 8,971,850 B2 | 3/2015 | Klein et al. | |
| 9,226,124 B2 | 12/2015 | Schuler et al. | |
| 9,232,362 B2 | 1/2016 | Bekiares et al. | |
| 10,127,596 B1* | 11/2018 | Franke | G06Q 30/0631 |
| 10,521,097 B1* | 12/2019 | Lam | G06F 30/394 |
| 10,521,280 B2 | 12/2019 | Zhang et al. | |
| 10,558,936 B2 | 2/2020 | Herman et al. | |
| 10,867,460 B1 | 12/2020 | Proctor | |
| 2007/0027881 A1 | 2/2007 | Srivastava | |
| 2012/0116836 A1 | 5/2012 | Flores et al. | |
| 2012/0291022 A1* | 11/2012 | Mehta | G06F 8/60 |
| | | | 717/176 |
| 2013/0179926 A1* | 7/2013 | White | H04L 12/2809 |
| | | | 725/59 |
| 2013/0254194 A1* | 9/2013 | Hadatsuki | H04M 1/72454 |
| | | | 707/736 |
| 2014/0129285 A1 | 5/2014 | Wu et al. | |
| 2014/0304027 A1 | 10/2014 | Wu et al. | |
| 2016/0063145 A1* | 3/2016 | Chang | G06Q 10/103 |
| | | | 703/6 |
| 2016/0080553 A1* | 3/2016 | Dempster | G08B 21/20 |
| | | | 455/550.1 |
| 2016/0217119 A1* | 7/2016 | Dakin | G06F 40/274 |
| 2017/0316363 A1* | 11/2017 | Siciliano | G06Q 10/06316 |
| 2018/0054719 A1 | 2/2018 | Lis et al. | |
| 2019/0258976 A1* | 8/2019 | Parees | G06F 8/20 |
| 2020/0004957 A1 | 1/2020 | Chamaraju et al. | |
| 2020/0329348 A1 | 10/2020 | Halun et al. | |
| 2021/0073026 A1* | 3/2021 | Myers | G06F 11/3065 |
| 2021/0182084 A1 | 6/2021 | Fariss et al. | |
| 2021/0198984 A1* | 7/2021 | Dumenil | G06G 7/48 |
| 2021/0366268 A1* | 11/2021 | Jain | G08B 31/00 |
| 2022/0188366 A1* | 6/2022 | Song | G06F 40/40 |
| 2023/0171156 A1* | 6/2023 | Firpo | G06Q 10/06 |
| | | | 709/226 |

OTHER PUBLICATIONS

The International Search Report and the Written Opinion, corresponding patent application serial No. PCT/US2022/050075 filed: Nov. 16, 2022, mailed: Feb. 28, 2023, all pages.

* cited by examiner

SYSTEM AND METHOD FOR ADAPTING WORKFLOWS BASED ON COMMONALITY WITH OTHERS

BACKGROUND

Managing multiple devices within a security ecosystem can be a time-consuming and challenging task. This task typically requires an in-depth knowledge of each type of device within the security ecosystem in order to produce a desired workflow when a security event is detected. For example, consider a school system that employs a security ecosystem comprising a radio communication system, a video security system, and a door access control system. Assume that an administrator wishes to implement a first workflow that notifies particular radios if a door breach is detected. Assume that the administrator also wishes to implement a second workflow that also notifies the particular radios when a security camera detects loitering. In order to implement these two workflows, the access control system will have to be configured to provide the notifications to the radios and the video security system will have to be configured to provide the notifications to the radios. Thus, both the access control system and the video security system will need to be configured separately in order to implement the two workflows. As is evident, this requires the administrator to have an in-depth knowledge of both the video security system and the access control system. Thus, the lack of continuity across systems is a burden to administrators since an in-depth knowledge of all systems within the ecosystem will be needed in order to properly configure workflows within the ecosystem.

In order to reduce the burden on administrators and enhance their efficiency, a need exists for a user-friendly interface tool that gives administrators the ability to configure and automate workflows that control their integrated security ecosystem. It would also be beneficial if such a tool equips administrators with the capabilities they need to detect triggers across a number of installed devices/systems and quickly take actions (execute workflows) to reduce the risk of breaches and downtime by automatically alerting the appropriate teams and executing the proper procedures.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1A:
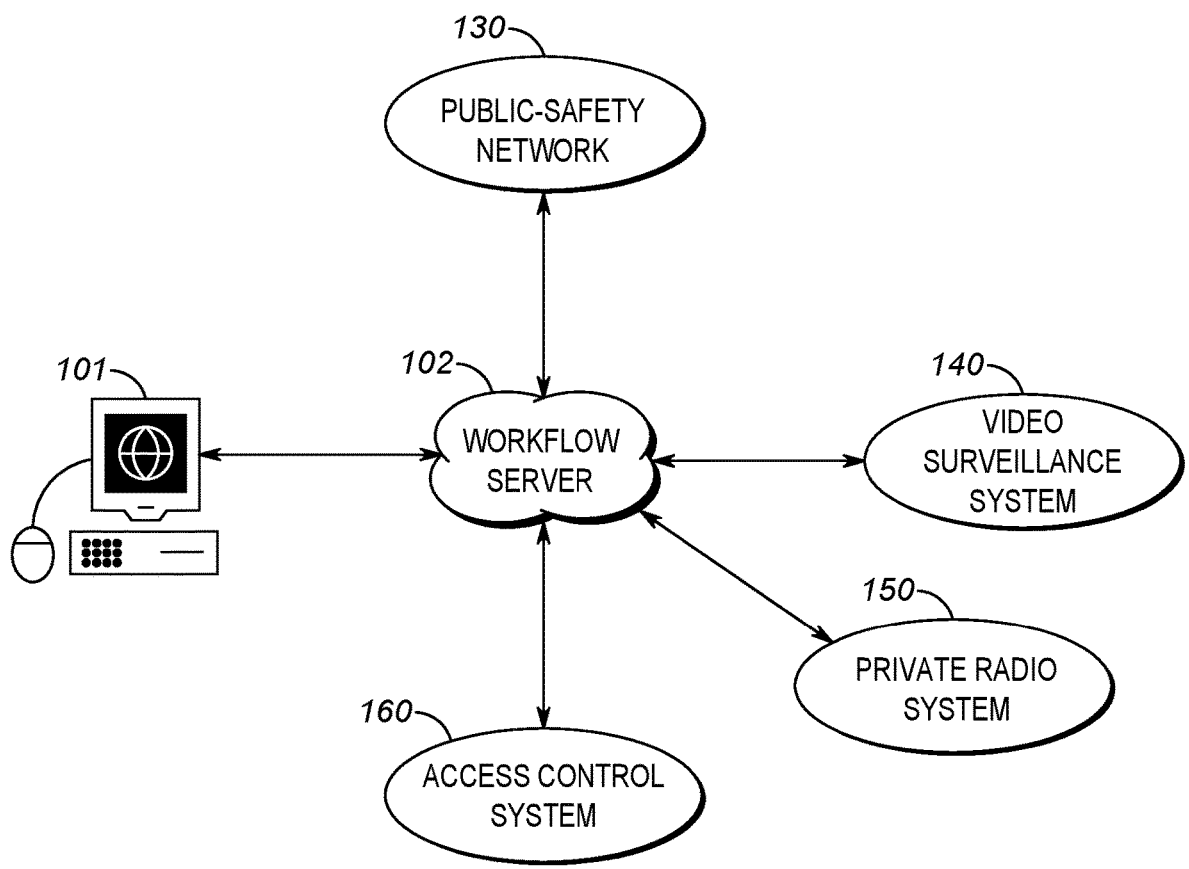
FIG. 1a illustrates a security ecosystem capable of configuring and automating workflows.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a system, method, and apparatus for implementing workflows across multiple differing systems and devices is provided herein. A workflow server is provided that allows a system administrator to abstract the configuration of each system. For example, the two situations described above (e.g. door breach, loitering) are each represented in the workflow server as a trigger. There is no need to initially define or integrate what happens when either of those triggers is received. Instead, the workflow server can be notified when either of those triggers occurs. Typically, triggers are received from some sort of sensor connected to the workflow server (e.g. door open sensor, video analytics to detect loitering, etc.).

Likewise, the outputs (e.g. notify radios) can be represented in the workflow server as actions. The actions can be any type of output from the system (e.g. notify radios, lock doors, open door, sound fire alarm, etc.). Actions are defined independent of triggers and triggers are defined independent of actions. When configuring the system, the administrator may simply drag an action item into the workspace. The administrator may then drag an action into the workspace. The two items can then be connected (e.g. using a graphical user interface to draw a line between the trigger and the action in the workspace, etc.). It should be noted that the system responsible for the trigger (e.g. access control system sensing door open, etc.) and the system responsible for initiating the action (e.g. radio system for notification) need not be configured to communicate with each other. Instead, a trigger is received by a workflow server and based on the defined workflow the workflow server initiates the action. In other words, the workflow allows each system to operate with other systems, without each system having to be specifically configured to operate with the other systems. FIGS. 1-6 describe a workflow server system that may utilize the techniques described herein.

A problem arises in that a system administrator may become overwhelmed with potential triggers, actions, and associated parameters when setting up a workflow. For example, in the case where a door open trigger causes a radio alert action to be sent to a security guard to investigate, there may be a timeout parameter that causes an escalation to occur if the action is not completed before the timeout occurs. The escalation may be that an escalation workflow is initiated. For example, the escalation workflow may cause the building to go into lock down because it is not known if anyone has entered the building. Incorrectly setting the timeout value may cause unnecessary building lockdowns if the timeout value is routinely exceeded. Likewise, with a given trigger, the system administrator may have difficulty determining which action should occur. For example, if there is a door open trigger, is the appropriate action to send a radio alert to a security guard or to perform a building lockdown?

The techniques described herein solve these problems individually and collectively. As a user, such as a system administrator, is creating a workflow, the system will monitor the workflow being created to detect similarities to workflows that have been created previously. For example, the user may create a workflow that has a trigger of door open and an action of alert radio of security guard. A previously existing workflow may have a trigger of window open and the same action. A score may be generated to indicate the degree of similarity. In the present example, 50% of the workflow (e.g. the same action in each workflow) is the same. If the score satisfies a predefined condition, such as being sufficiently high, a feature of the previously created workflow that is not currently included in the workflow being created may be suggested to the user for inclusion in the workflow being created. For example, a feature of the existing workflow could be a timeout of 3 minutes for the action to be executed. The feature (e.g. a timeout of 3 minutes) may be suggested for inclusion into the workflow being created.

Once the workflow has been created, the system may monitor the effectiveness of the created workflow. For example, assume the timeout value of the previously created workflow was accepted for inclusion into the workflow that was just created. The system may monitor execution of the created workflow to determine if the included feature (e.g. the timeout value) is effective. For example, if the workflow is consistently timing out, then the value for the timeout may not be appropriate. The system may store this information for use when a third workflow is created. Even if the third workflow is sufficiently similar to the created workflow, features from the created workflow may not be suggested for inclusion into the third workflow, because of the ineffectiveness of the feature in the created workflow.

A method is provided. The method includes detecting that a workflow server connected to a network is being configured, via a user interface, to create a workflow, wherein the workflow includes detecting a trigger via a sensor in the network and causing an action to execute at a device in the network in response to the trigger. The method also includes comparing the workflow being created to a previously created workflow to generate a score that indicates a degree of similarity between the workflow being created and the previously created workflow. The method also includes upon verifying that the score satisfies a predefined condition, selecting at least one feature of the previously created workflow that is not currently included in the workflow being created. The method also includes signaling the user interface to display an indication to propose that the feature be included in the workflow being created.

In one aspect, comparing the workflow being created to a previously created workflow to generate the score comprises at least one of comparing a type of the trigger to a type of a second trigger to be detected in the previously created workflow and comparing a type of the sensor to a type of a second sensor through which the second trigger is to be detected in the previously created workflow. In one aspect, comparing the workflow being created to a previously created workflow to generate the score comprises comparing a first geographical constraint that applies to the workflow being created to a second geographical constraint that applies to the previously created workflow.

In one aspect, comparing the workflow being created to a previously created workflow to generate the score comprises comparing a network topology of the network to a second network topology of a second network in which the previously created workflow was effectuated. In one aspect, comparing the workflow being created to a previously created workflow to generate the score comprises comparing a profile of an entity that controls the workflow being created to a profile of an entity that controls the previously created workflow.

In one aspect, the indication includes an icon, and the method further comprises detecting a user input that selects the icon and in response to detecting the user input, adding the feature to the workflow being created. In one aspect, the feature comprises an additional action to be triggered at an additional device in the network in response to the trigger. In one aspect, the feature comprises a threshold response time that specifies an upper bound for an amount of time that can elapse between detection of the trigger and detection of completion of the action executed in response to the trigger. In one aspect, the feature comprises a response from a responder within the threshold response time. In one aspect, the feature comprises a threshold value for a metric measured by the sensor, wherein detecting the trigger comprises detecting that the metric meets the threshold value.

A system is provided. The system comprises a processor and a memory coupled to the processor. The memory contains a set of instructions thereon that when executed by the processor cause the processor to detect that a workflow server connected to a network is being configured, via a user interface, to create a workflow, wherein the workflow includes detecting a trigger via a sensor in the network and causing an action to execute at a device in the network in response to the trigger. The instructions further cause the processor to compare the workflow being created to a previously created workflow to generate a score that indicates a degree of similarity between the workflow being created and the previously created workflow. The instructions further cause the processor to upon verifying that the score satisfies a predefined condition, select at least one feature of the previously created workflow that is not currently included in the workflow being created. The instructions further cause the processor to signal the user interface to display an indication to propose that the feature be included in the workflow being created.

In one aspect, the feature comprises an additional action to be triggered at an additional device in the network in response to the trigger. In one aspect, the feature comprises a threshold response time that specifies an upper bound for an amount of time that can elapse between detection of the trigger and detection of completion of the action executed in response to the trigger. In one aspect, completion of the action further comprises a response from a responder within the threshold response time. In one aspect, the feature comprises a threshold value for a metric measured by the sensor, wherein the instructions to detect the trigger further comprises instructions to detect that the metric meets the threshold value.

A non-transitory processor readable medium is provided. The medium contains a set of instructions thereon that when executed by a processor cause the processor to detect that a workflow server connected to a network is being configured, via a user interface, to create a workflow, wherein the workflow includes detecting a trigger via a sensor in the network and causing an action to execute at a device in the network in response to the trigger. The instructions further cause the processor to compare the workflow being created to a previously created workflow to generate a score that indicates a degree of similarity between the workflow being created and the previously created workflow. The instructions further cause the processor to upon verifying that the score satisfies a predefined condition, select at least one feature of the previously created workflow that is not currently included in the workflow being created. The instructions further cause the processor to signal the user interface to display an indication to propose that the feature be included in the workflow being created.

Turning now to the drawings, wherein like numerals designate like components, FIG. 1a illustrates security ecosystem 100 capable of configuring and automating workflows across multiple systems. As shown, security ecosystem 100 comprises public-safety network 130, video surveillance system 140, private radio system 150, and access control system 160. Workflow server 102 is coupled to each system 130, 140, 150, and 160. Workstation 101 is shown coupled to workflow server 102, and is utilized to configure server 102 with workflows created by a user. It should be noted that although the components in FIG. 1 are shown geographically separated, these components can exist within a same geographic area, such as, but not limited to a school, a hospital, an airport, a sporting event, a stadium, . . . , etc. It should also be noted that although only networks and systems 130-160 are shown in FIG. 1a, one of ordinary skill in the art will recognize that many more networks and systems may be included in ecosystem 100.

Workstation 101 is preferably a computer configured to execute Motorola Solution's Orchestrate™ and Ally™ dispatch and incident management software. As will be discussed in more detail below, workstation 101 is configured to present a user with a plurality of triggers capable of being detected by network and systems 130-160 as well as present the user with a plurality of actions capable of being executed by network and systems 130-160. The user will be able to create workflows and upload these workflows to workflow server 102 based on the presented triggers and actions.

Workflow server 102 is preferably a server running Motorola Solution's Command Central™ software suite comprising the Orchestrate™ platform. Workflow server 102 is configured to receive workflows created by workstation 101 and implement the workflows. Particularly, the workflows are implemented by analyzing events detected by network and systems 130-160 and executing appropriate triggers. For example, assume a user creates a workflow on workstation 101 that has a trigger comprising surveillance system 140 detecting a loitering event, and has an action comprising notifying radios within public-safety network 130. When this workflow is uploaded to workflow server 102, workflow server 102 will notify the radios of any loitering event detected by surveillance system 140.

Public-safety network 130 is configured to detect various triggers and report the detected triggers to workflow server 102. Public-safety network 130 is also configured to receive action commands from workflow server 102 and execute the actions. In one embodiment of the present invention, public-safety network 130 comprises includes typical radio-access network (RAN) elements such as base stations, base station controllers (BSCs), routers, switches, and the like, arranged, connected, and programmed to provide wireless service to user equipment, report detected events, and execute actions received from workflow server 102.

Video surveillance system 140 is configured to detect various triggers and report the detected triggers to workflow server 102. Public-safety network 130 is also configured to receive action commands from workflow server 102 and execute the actions. In one embodiment of the present invention, video surveillance system 140 comprises a plurality of video cameras that may be configured to automatically change their field of views over time. Video surveillance system 140 is configured with a recognition engine/ video analysis engine (VAE) that comprises a software engine that analyzes any video captured by the cameras. Using the VAE, the video surveillance system 140 is capable of "watching" video to detect any triggers and report the detected triggers to workflow server 102. In a similar manner, video surveillance system 140 is configured to execute action commands received from workflow server 102. In one embodiment of the present invention, video surveillance system 140 comprises an Avigilon™ Control Center (ACC) server having Motorola Solution's Access Control Management (ACM)™ software suite.

Radio system 150 preferably comprises a private enterprise radio system that is configured to detect various triggers and report the detected triggers to workflow server 102. Radio system 150 is also configured to receive action commands from workflow server 102 and execute the actions. In one embodiment of the present invention, radio system 150 comprises a MOTOBRO™ communication system having radio devices that operate in the CBRS spectrum and combines broadband data with voice communications.

Finally, access control system 160 comprises an IoT network. IoT system 160 serves to connect every-day devices to the Internet. Devices such as cars, kitchen appliances, medical devices, sensors, doors, windows, HVAC systems, drones, . . . , etc. can all be connected through the IoT. Basically, anything that can be powered can be connected to the internet to control its functionality. System 160 allows objects to be sensed or controlled remotely across existing network infrastructure. For example, access control system 160 may be configured to provide access control to various doors and windows. With this in mind, access control system 160 is configured to detect various triggers (e.g., door opened/closed) and report the detected triggers to workflow server 102. Access control system 160 is also configured to receive action commands from workflow server 102 and execute the action received from workflow server 102. The action commands may take the form of instructions to lock, open, and/or close a door or window.

As is evident, the above security ecosystem 100 allows an administrator using workstation 101 to create rule-based, automated workflows between technologies to enhance efficiency, and improve response times, effectiveness, and overall safety. The above ecosystem 100 has the capability to detect triggers across a number of devices within network and systems 130-160 quickly take actions by automatically executing the proper procedure (i.e., executing the appropriate action once a trigger is detected).

Figure 1B:
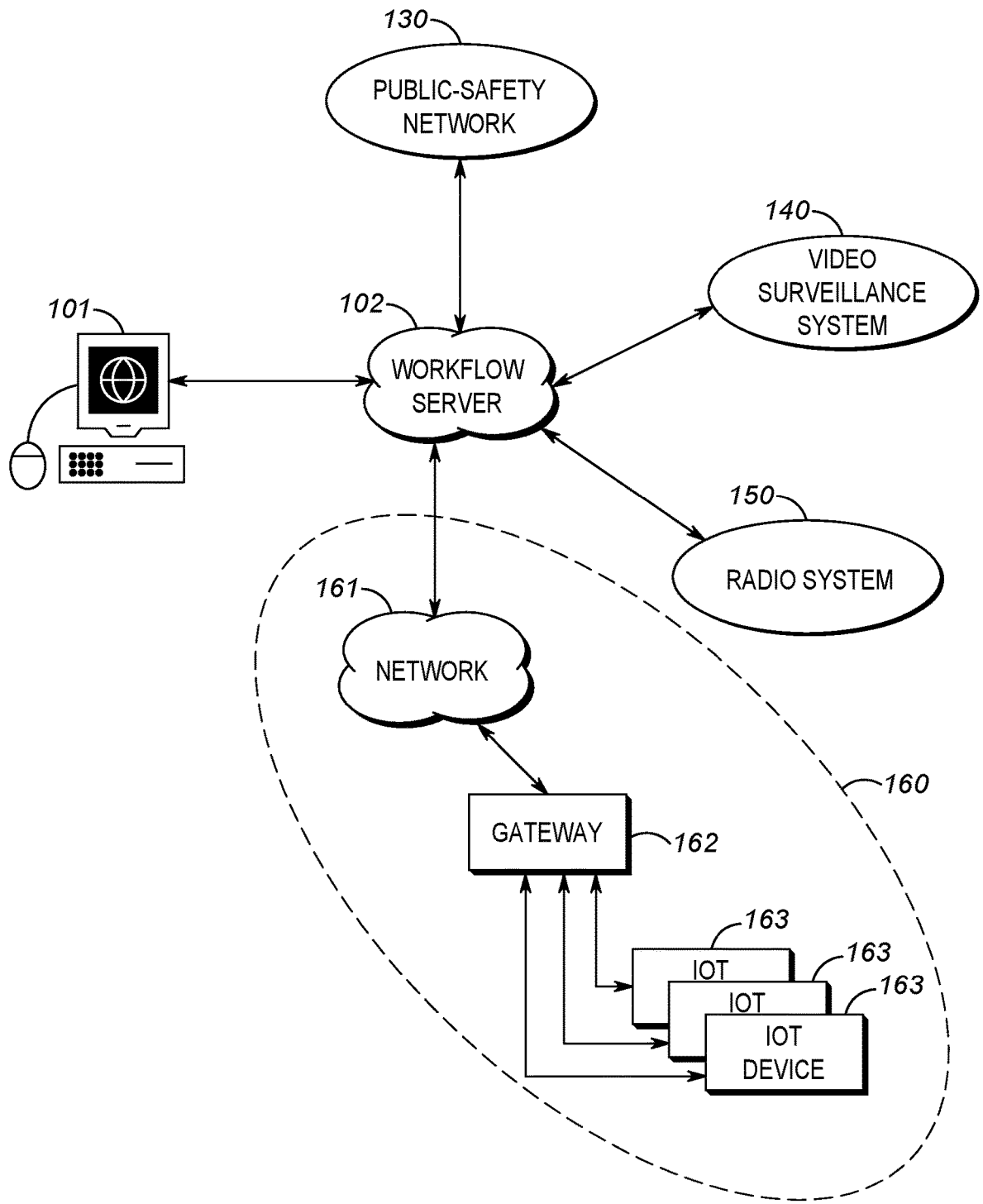
FIG. 1B illustrates a security ecosystem capable of configuring and automating workflows.

FIG. 1B illustrates a security ecosystem capable of configuring and automating workflows. In particular, FIG. 1B shows security ecosystem 100 with an expanded view of access control system 160. As shown, access control system 160 comprises a plurality of IoT devices 163 coupled to gateway 162. Data passed from workflow server 102 to IoT devices 163 passes through network 161, gateway 162 and ultimately to IoT device 163. Conversely, data passed from IoT devices 163 to workflow server 102 passes through gateway 162, network 161, and ultimately to workflow server 102.

IoT devices 163 preferably comprise devices that control objects, doors, windows, sensors, . . . , etc. As is known in the art, a particular communication protocol (IoT protocol) may be used for each IoT device. For example, various proprietary protocols such as DNP, Various IEC**** protocols (IEC 61850 etc. . . . ), bacnet, EtherCat, CANOpen, Modbus/Modbus TCP, EtherNet/IP, PROFIBUS, PROFINET, DeviceNet, . . . , etc. can be used. Also a more generic protocol such as Coap, Mqtt, and RESTfull may also be used.

Gateway 162 preferably comprises an Avigilon™ Control Center running Avigilon's Access Control Management software. Gateway 162 is configured to run the necessary Application Program Interface (API) to provide communications between any IoT device 163 and workflow server 102.

Network 161 preferably comprises one of many networks used to transmit data, such as but not limited to a network employing one of the following protocols: a Long Term Evolution (LTE) protocol, LTE-Advance protocol, or 5G protocol including multimedia broadcast multicast services (MBMS) or single site point-to-multipoint (SC-PTM) protocol over which an open mobile alliance (OMA) push to talk (PTT) over cellular protocol (OMA-PoC), a voice over IP (VoIP) protocol, an LTE Direct or LTE Device to Device protocol, or a PTT over IP (PoIP) protocol, a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

Figure 1C:
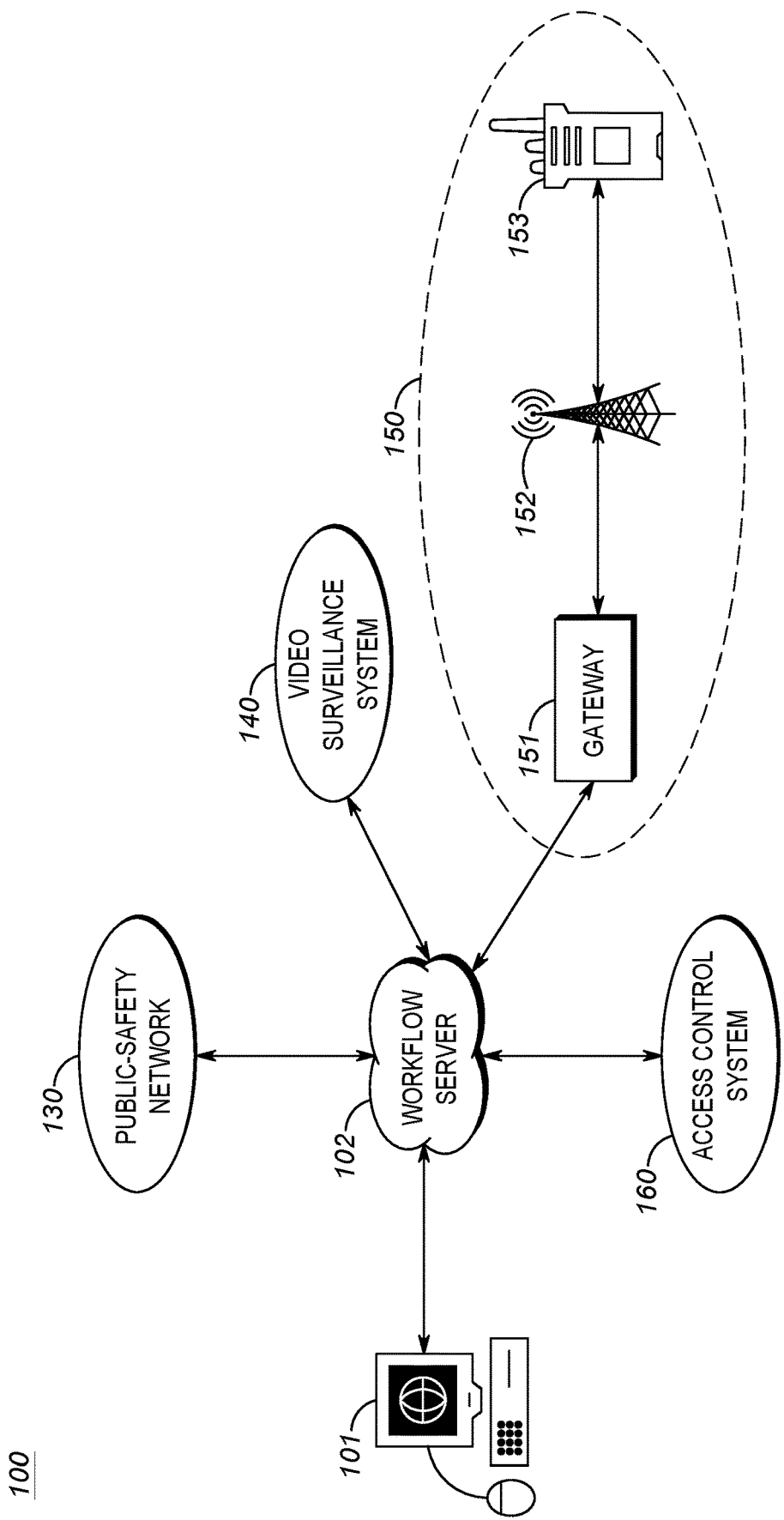
FIG. 1c illustrates a security ecosystem capable of configuring and automating workflows.

FIG. 1c illustrates a security ecosystem capable of configuring and automating workflows. In particular, FIG. 1c shows security ecosystem 100 with an expanded view of radio system 150. As shown, radio system 150 comprises gateway 151, system infrastructure 152, and at least one radio 153. Communications from radio 153 to workflow server 102 passes through infrastructure 152, gateway 151, and ultimately to workflow server 102.

Gateway 151 preferably comprises an Avigilon™ Control Center running Avigilon's Access Control Management software. Gateway 151 is configured to run the necessary Application Program Interface (API) to provide communications between any infrastructure 152 and workflow server 102.

Infrastructure 152 comprises the necessary equipment to provide wireless communications to and from radio 153. Preferably, infrastructure 152 comprises Motorola Solutions MOTOBRO™ equipment, such as an SLR Series Repeater (e.g., SLR 1000, SLR 5000, or SLR8000 repeater) configured to provide two-way radio service to radio 153.

Although only a single radio 153 is shown in FIG. 1c, one of ordinary skill in the art will recognize that many radios 153 may be present within radio system 150. Each radio 153 preferably comprises a MOTOBRO™ two-way radio (such as a Motorola Solution XPR 5000 Series radio) with digital technology providing integrated voice and data communication.

Figure 1D:
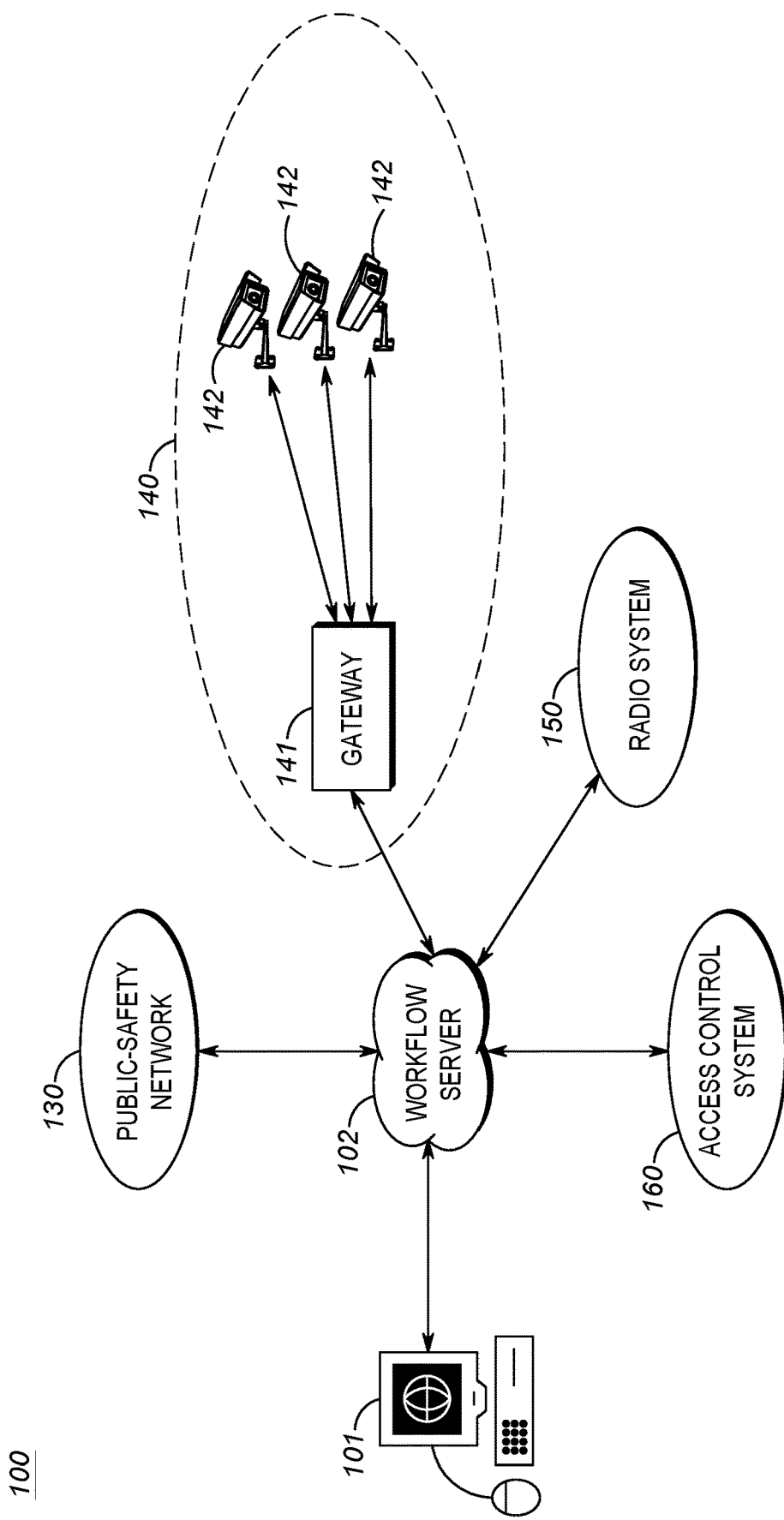
FIG. 1d illustrates a security ecosystem capable of configuring and automating workflows.

FIG. 1d illustrates a security ecosystem capable of configuring and automating workflows. In particular, FIG. 1d shows security ecosystem 100 with an expanded view of video surveillance system 140. As shown, video surveillance system 140 comprises a plurality of cameras 142 and gateway 141.

Cameras 142 may be fixed or mobile, and may have pan/tilt/zoom (PTZ) capabilities to change their field of view. Cameras 142 may also comprise circuitry configured to serve as a video analysis engine (VAE) which comprises a software engine that analyzes analog and/or digital video. The engine configured to "watch" video and detect preselected objects such as license plates, people, faces, automobiles. The software engine may also be configured to detect certain actions of individuals, such as fighting, loitering, crimes being committed, . . . , etc. The VAE may contain any of several object/action detectors. Each object/action detector "watches" the video for a particular type of object or action. Object and action detectors can be mixed and matched depending upon what is trying to be detected. For example, an automobile object detector may be utilized to detect automobiles, while a fire detector may be utilized to detect fires.

Gateway 141 preferably comprises an Avigilon™ Control Center running Avigilon's Access Control Management software. Gateway 141 is configured to run the necessary Application Program Interface (API) to provide communications between any cameras 142 and workflow server 102.

Figure 1E:
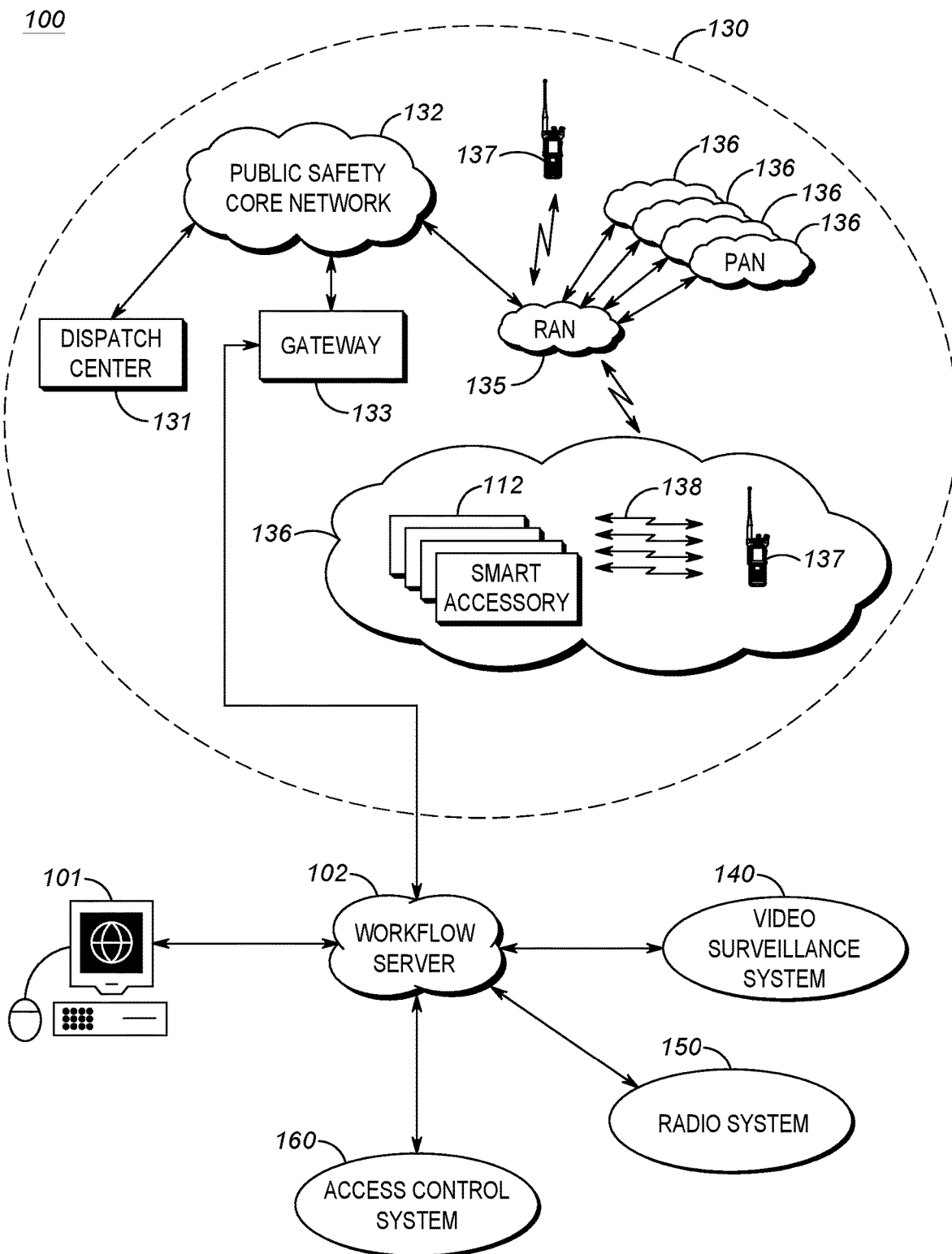
FIG. 1e illustrates a security ecosystem capable of configuring and automating workflows.

FIG. 1e illustrates a security ecosystem capable of configuring and automating workflows. In particular, FIG. 1e shows security ecosystem 100 with an expanded view of public safety network 130. As shown, public-safety network 130 comprises gateway 133, public-safety core network 132, dispatch center 131, radio access network (RAN) 135, at least one public-safety radio 137, and a plurality of personal-area networks (PANs) 136. As shown, each PAN 136 comprises radio 137 acting as a hub to smart devices/accessories 112.

Gateway 133 preferably comprises an Avigilon™ Control Center running Avigilon's Access Control Management software. Gateway 133 is configured to run the necessary Application Program Interface (API) to provide communications between public-safety core network 132 and workflow server 102.

A public safety officer (not shown in FIG. 1e) will be equipped with devices 112 that determine various physical and environmental conditions surrounding the public-safety officer. These conditions may be reported back to, for example, dispatch center 131 or workflow server 102 so an appropriate action may be taken. For example, future police officers may have a sensor 112 that determines when a gun is drawn. Upon detecting that an officer has drawn their gun, a notification may be sent back to the dispatch operator and/or workflow server 102 so that, for example, other officers in the area may be notified of the situation.

It is envisioned that the public-safety officer will have an array of these shelved devices 112 available to the officer at the beginning of a shift. The officer will select devices 112 off the shelf, and form a personal area network (PAN) with the devices that will accompany the officer on their shift. For example, the officer may pull a gun-draw sensor, a body-worn camera, a wireless microphone, a smart watch, a police radio, smart handcuffs, a man-down sensor, a biosensor, . . . , etc. All devices 112 pulled by the officer will be configured to form a PAN by associating (pairing) with each other and communicating wirelessly among the devices. At least one device may be configured with a digital assistant. In a preferred embodiment, the PAN comprises more than two devices, so that many devices may be connected via the PAN simultaneously.

A method called bonding is typically used for recognizing specific devices 112 and thus enabling control over which devices are allowed to connect to each other when forming the PAN. Once bonded, devices then can establish a connection without user intervention. A bond is created through a process called "pairing". The pairing process is typically triggered by a specific request by the user to create a bond from a user via a user interface on the device. Thus, as shown, public-safety communication system 130 incorporates PANs 136 created as described above. In a preferred embodiment of the present invention, radios 137 and devices 112 form PAN 136, with communication links 138 between devices 112 and radios 137 taking place utilizing a short-range communication system protocol such as a Bluetooth communication system protocol. In this particular embodiment, a pan will be associated with a single officer. Thus, FIG. 1e illustrates multiple PANs 136 associated with multiple officers (not shown).

RAN 135 includes typical RAN elements such as base stations, base station controllers (BSCs), routers, switches, and the like, arranged, connected, and programmed to provide wireless service to user equipment (e.g., radios 137, and the like) in a manner known to those of skill in the relevant art. RAN 135 may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, RAN 135 may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, RAN 135 may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

Public-safety core network 132 may include one or more packet-switched networks and/or one or more circuit-switched networks, and in general provides one or more public-safety agencies with any necessary computing and communication needs, transmitting any necessary public-safety-related data and communications.

For narrowband LMR wireless systems, core network 132 operates in either a conventional or trunked configuration. In either configuration, a plurality of communication devices is partitioned into separate groups (talkgroups) of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some embodiments, group IDs may be present in the group data to distinguish between groups using the same shared frequency).

In contrast, a trunked radio system and its communication devices use a pool of traffic channels for virtually an unlimited number of groups of communication devices (e.g., talkgroups). Thus, all groups are served by all channels. The trunked radio system works to take advantage of the probability that not all groups need a traffic channel for communication at the same time.

Group calls may be made between radios 137 and other devices via wireless transmissions in accordance with either a narrowband or a broadband protocol or standard. Group members for group calls may be statically or dynamically defined. That is, in a first example, a user or administrator may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., join a group call having a particular talkgroup ID) with each of the pre-designated participants in the defined group. In another example, communication devices may dynamically affiliate with a group (and also disassociate with the group) perhaps based on user input, and the switching and/or radio network may track group membership and route new group calls according to the current group membership.

Radios 137 serves as a PAN main device, and may be any suitable computing and communication device configured to engage in wireless communication with the RAN 135 over the air interface as is known to those in the relevant art. Moreover, one or more radios 137 are further configured to engage in wired and/or wireless communication with one or more local device 112 via the communication link 138. Radios 137 will be configured to determine when to forward information received from PAN devices to, for example, a dispatch center or workflow server 102.

Some examples follow of devices 112 follow:

A sensor-enabled holster 112 may be provided that maintains and/or provides state information regarding a weapon or other item normally disposed within the user's sensor-enabled holster 112. The sensor-enabled holster 112 may detect a change in state (presence to absence) and/or an action (removal) relative to the weapon normally disposed within the sensor-enabled holster 112. The detected change in state and/or action may be reported to portable radio 137 via its short-range transceiver, which may forward the state change to dispatch center 131 or workflow server 102. In some embodiments, the sensor-enabled holster may also detect whether the first responder's hand is resting on the weapon even if it has not yet been removed from the holster and provide such information to portable radio 137.

A biometric sensor 112 (e.g., a biometric wristband) may be provided for tracking an activity of the user or a health status of a user, and may include one or more movement sensors (such as an accelerometer, magnetometer, and/or gyroscope) that may periodically or intermittently provide to the portable radio 137 indications of orientation, direction, steps, acceleration, and/or speed, and indications of health such as one or more of a captured heart rate, a captured breathing rate, and a captured body temperature of the user, perhaps accompanying other information. This information may be reported to radio 137 which may forward the information to dispatch center 131 and/or workflow server 102.

An accelerometer 112 may be provided to measures acceleration. Single and multi-axis models are available to detect magnitude and direction of the acceleration as a vector quantity, and may be used to sense orientation, acceleration, vibration shock, and falling. The accelerometer 112 may determine if an officer is running. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing. This information may be reported to radio 137 which may forward the information to dispatch center 131 and/or workflow server 102.

A heart rate sensor 112 may be provided and use electrical contacts with the skin to monitor an electrocardiography (EKG) signal of its wearer, or may use infrared light and imaging device to optically detect a pulse rate of its wearer, among other possibilities. This information may be reported to radio 137 which may forward the information to dispatch center 131 and/or workflow server 102.

A breathing rate sensor 112 may be provided to monitor breathing rate. The breathing rate sensor may include use of a differential capacitive circuits or capacitive transducers to measure chest displacement and thus breathing rates. In other embodiments, a breathing sensor may monitor a periodicity of mouth and/or nose-exhaled air (e.g., using a humidity sensor, temperature sensor, capnometer or spirometer) to detect a respiration rate. Other possibilities exist as well. This information may be reported to radio 137 which may forward the information to dispatch center 131 and/or workflow server 102.

Dispatch center 131 comprises, or is part of, a computer-aided-dispatch center (sometimes referred to as an emergency-call center or public-safety answering point), that may be manned by an operator providing necessary dispatch operations. For example, dispatch center 131 typically comprises a graphical user interface that provides the dispatch operator necessary information about public-safety officers. As discussed above, some of this information originates from devices 112 providing information to radios 137, which forwards the information to RAN 135 and ultimately to dispatch center 131.

In a similar manner information about public-safety officers may be provided to workflow server 102. This information originates from devices 112 providing information to radios 137, which forwards the information to RAN 135 and ultimately to workflow server 102 via core network 132 and gateway 133. For example, a gun-draw sensor 112 may send an indication to workflow server 102 that a gun has been drawn. This may serve as a "trigger" for workflow server 102 to initiate a particular "action", for example, notifying surrounding officers (for example on a particular talkgroup) by having their radios 137 provide an alarm indicating the triggering event. Thus, workflow server 102 may provide instructions to any device 112 or radio 137 by sending an "action" to devices 112 in response to a trigger being received.

Figure 2:
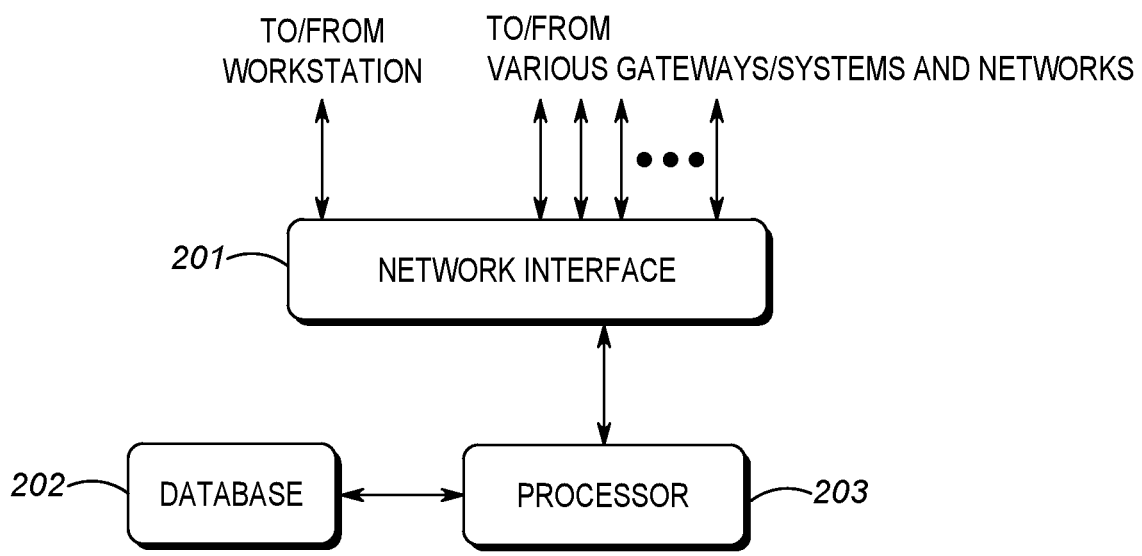
FIG. 2 is a block diagram of a workflow server of FIG. 1.

FIG. 2 is a block diagram of a workflow server of FIG. 1. As shown, workflow server 102 comprises network interface 201, database 202, and processor (serving as logic circuitry) 203.

Network interface 201 includes elements including processing, modulating, and transceiver elements that are operable in accordance with any one or more standard or proprietary wireless interfaces, wherein some of the functionality of the processing, modulating, and transceiver elements may be performed by means of processor 203 through programmed logic such as software applications or firmware stored on the storage component 202 (e.g., standard random access memory) or through hardware. Examples of network interfaces (wired or wireless) include Ethernet, T1, USB interfaces, IEEE 802.11b, IEEE 802.11g, etc.

Logic circuitry 403 comprises a digital signal processor (DSP), general purpose microprocessor, a programmable logic device, or application specific integrated circuit (ASIC) and is configured to receive triggers from various gateways, systems, and networks. Once a trigger is received, logic circuitry 203 is configured to execute (or cause to be executed) a particular action for the trigger. More particularly, when logic circuitry 203 receives a trigger from any attached network or system, logic circuitry will access database 202 to determine an action for the particular trigger. Once an action has been determined, logic circuitry will execute the action, or cause the action to be executed. In order to perform the above, logic circuitry executes an instruction set/software (e.g., Motorola Solution's Command Central™ software suite comprising the Orchestrate™ platform) stored in database 202.

Database 202 comprises standard memory (such as RAM, ROM, . . . , etc) and serves to store associations between triggers and actions. This is illustrated in Table 1, below.

TABLE 1

Associations Between Triggers and Actions.

| Trigger | Action |
| --- | --- |
| Warehouse back door opened | Pan camera 342 to point at door |
| Man-Down sensor activated for Officer Smith | Notify dispatch center via emergency text message |
| ALPR for delivery truck | Open back gate |
| . . . etc. | . . . etc. |

Figure 3:
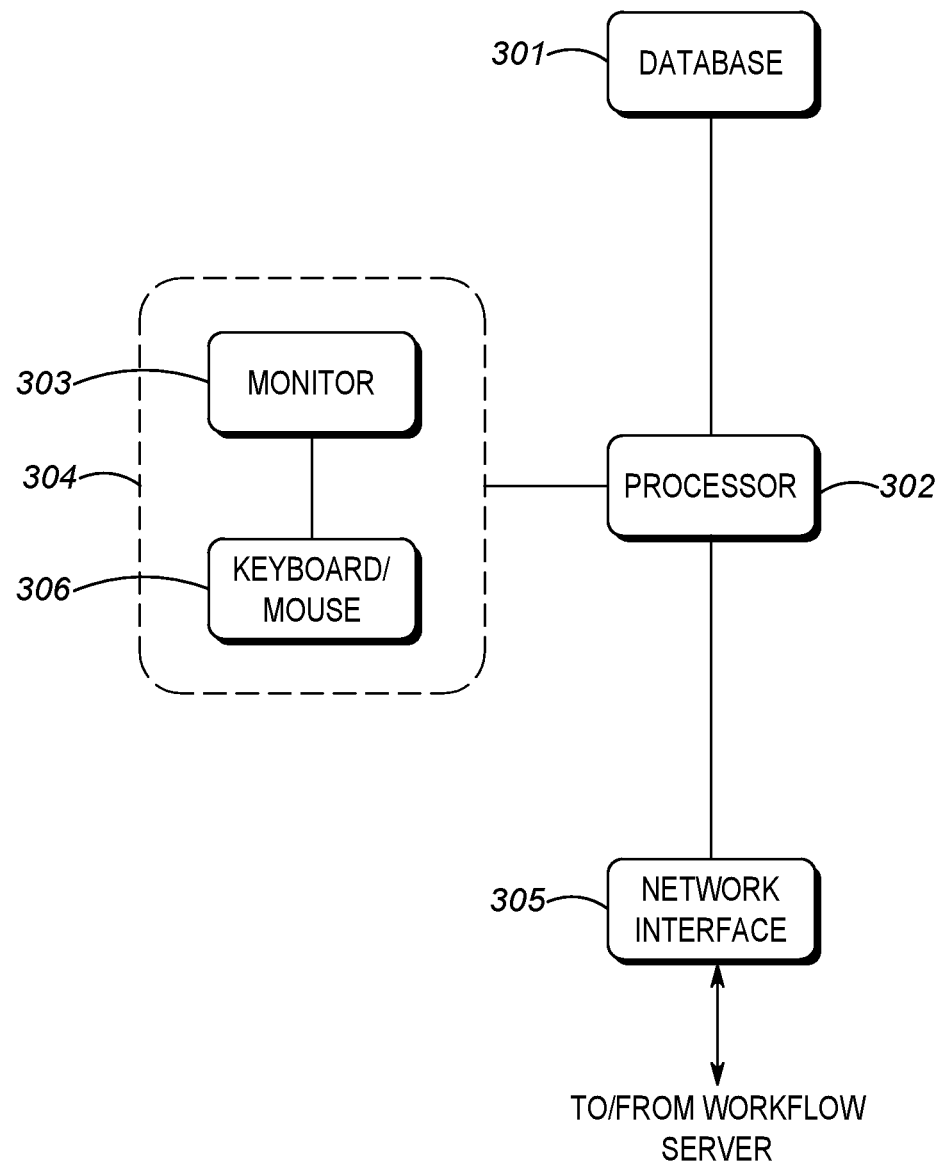
FIG. 3 is a block diagram of a workstation of FIG. 1 utilized to create a workflow.

FIG. 3 is a block diagram of a workstation of FIG. 1 utilized to create a workflow. As shown, workstation 101 comprises database 301, processor 302, graphical user interface 304, and network interface 305.

Network interface 305 includes elements including processing, modulating, and transceiver elements that are operable in accordance with any one or more standard or proprietary wireless interfaces, wherein some of the functionality of the processing, modulating, and transceiver elements may be performed by means of processor 302 through programmed logic such as software applications or firmware stored on the storage component 301 (e.g., standard random access memory) or through hardware. Examples of network interfaces (wired or wireless) include Ethernet, T1, USB interfaces, IEEE 802.11b, IEEE 802.11g, etc.

Logic circuitry 302 comprises a digital signal processor (DSP), general purpose microprocessor, a programmable logic device, or application specific integrated circuit (ASIC) and is configured to execute Motorola Solution's Orchestrate™ and Ally™ dispatch and incident management software from storage 301. The execution of such software will allow users of GUI 304 to create workflows (i.e., actions and their associated responses) by receiving user inputs from GUI 304 that define various triggers and their associated actions, which will ultimately be uploaded to workflow server 102 and stored in database 202.

Database 301 comprises standard memory (such as RAM, ROM, . . . , etc) and serves to store instructions as software. Particularly, Motorola Solution's Orchestrate™ and Ally™ dispatch and incident management software is stored in database 301.

GUI 304 provides a man/machine interface for receiving an input from a user and displaying information. For example, GUI 304 provides a way of conveying (e.g., displaying) user-created workflows. Thus, GUI 304 also provides means for a user to input workflows into a displayed form. In order to provide the above features (and additional features), GUI 304 may comprises any combination of monitor 303 (e.g., touch screen, a computer screen, . . . , etc.) and keyboard/mouse combination 306.

Figure 4:
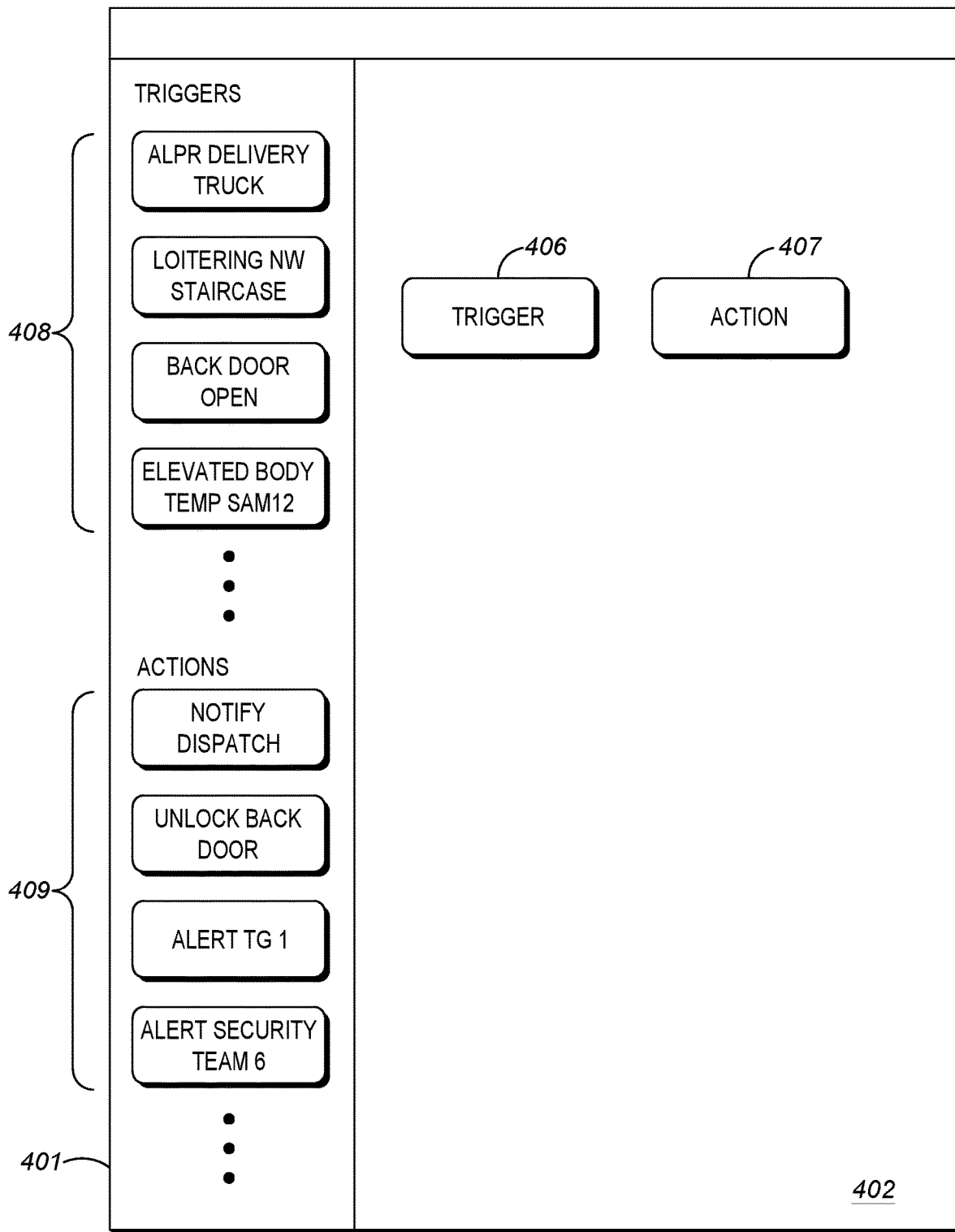
FIG. 4 illustrates the creation of a workflow.

FIG. 4 illustrates the creation of a workflow. More particularly, FIG. 4 illustrates a dashboard displayed on monitor 303 utilized for the creation of workflows. The dashboard consists of the following main elements:

selection pane 401 on the left-hand side, which comprises the available triggers 408 and actions 409;

workspace 402, which comprises the large area in the middle of the dashboard used to create workflows that define the connections between products. Each workflow in the workspace is displayed as a separate field 406 and 407 with an outline and a title. As shown in FIG. 4, two fields 406 and 407 are shown, one labeled "trigger" and another labeled "action".

Triggers 408 represent the events originating from various sensors, software, and devices within security ecosystem 100. Actions 409 represent the possible responses to the triggers.

After a workflow is deployed (i.e., uploaded to workflow server 102), its actions activate when the triggers occur. Triggers and actions appear on the workspace after they are dragged and dropped from the triggers 408 and actions 409 tabs respectively. Connecting the triggers and actions on the workspace (as described below) will create a workflow.

All triggers 408 and actions 409 are stored in database 301 and represent integrations across multiple products. In other words, triggers and actions comprise triggers and actions for all of the components available in security ecosystem 100. This includes cameras, sensors, IoT devices, radios, . . . , etc. As administrators add additional technology pieces to security ecosystem 100, those pieces are automatically made available for workflow creation as discussed herein.

In order to associate a trigger with an action, a user selects a trigger from all possible triggers 406, and drags and drops it onto workspace area 402. The user then selects an action for the trigger, and drags and drops it onto workspace area 402. In order to associate the trigger with the action, they must be connected. To connect the trigger and actions, a user will click the end of one of the node, and drag a line to the other node.

Figure 5:
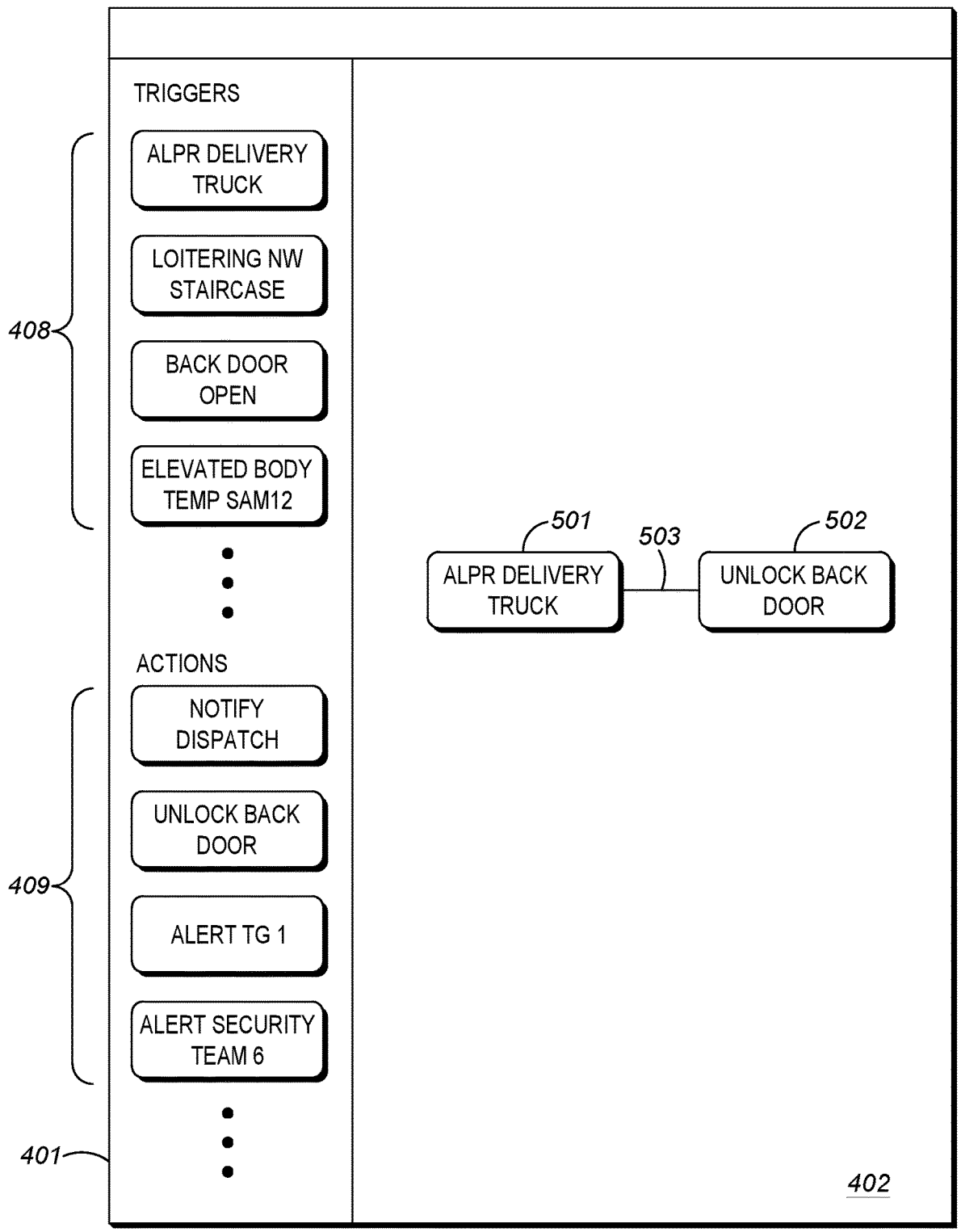
FIG. 5 illustrates the creation of a workflow.

As shown in FIG. 5, a trigger "ALPR delivery truck" 501 has been associated with an action "unlock back door" 502 by dragging line 503 between the two. If any of the triggers within a trigger group occurs, the workflow is initiated causing the action to be executed.

Figure 6:
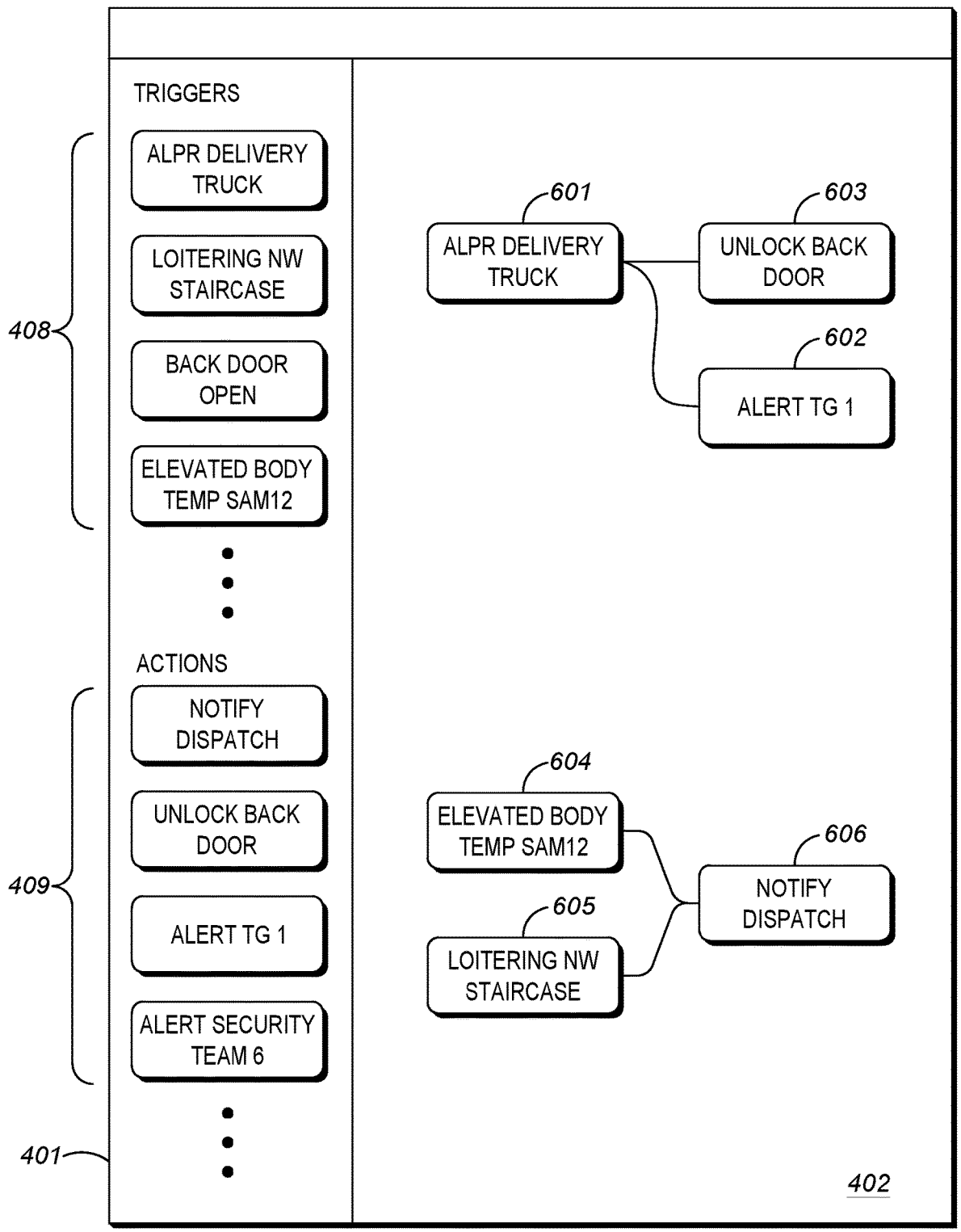
FIG. 6 illustrates the creation of a workflow.

As illustrated in FIG. 6, a single trigger may be associated with multiple actions. Thus, the trigger "ALPR delivery truck" 601 may be associated with action "unlock back door" 603 as well as associated with "alert TG 1" 602. When this workspace is uploaded to workflow server 102, the automatic license plate detected for the delivery truck will cause both the back door to unlock and an alert to be sent on talkgroup #1.

In a similar manner multiple triggers may be associated with a single action. Thus, both the triggers "elevated body tem SAM 12" 604 and "loitering NW staircase" will cause the action of "notify dispatch" 606. Thus, when officer SAM 12 has an elevated body temperature dispatch is notified, and when loitering is detected in the NW staircase, dispatch is notified.

As mentioned above, a problem arises in that a system administrator may become overwhelmed with potential triggers, actions, and associated parameters when setting up a workflow. The user may not initially understand which triggers should result in which actions, which actions should be caused by which triggers, or parameters associated with each workflow overall. Furthermore, in some cases, similar workflows may have been created by others. It would be beneficial to the system administrator to gain knowledge from workflows created by others, rather than for each system administrator to recreate work that has been done by others.

Figure 7:
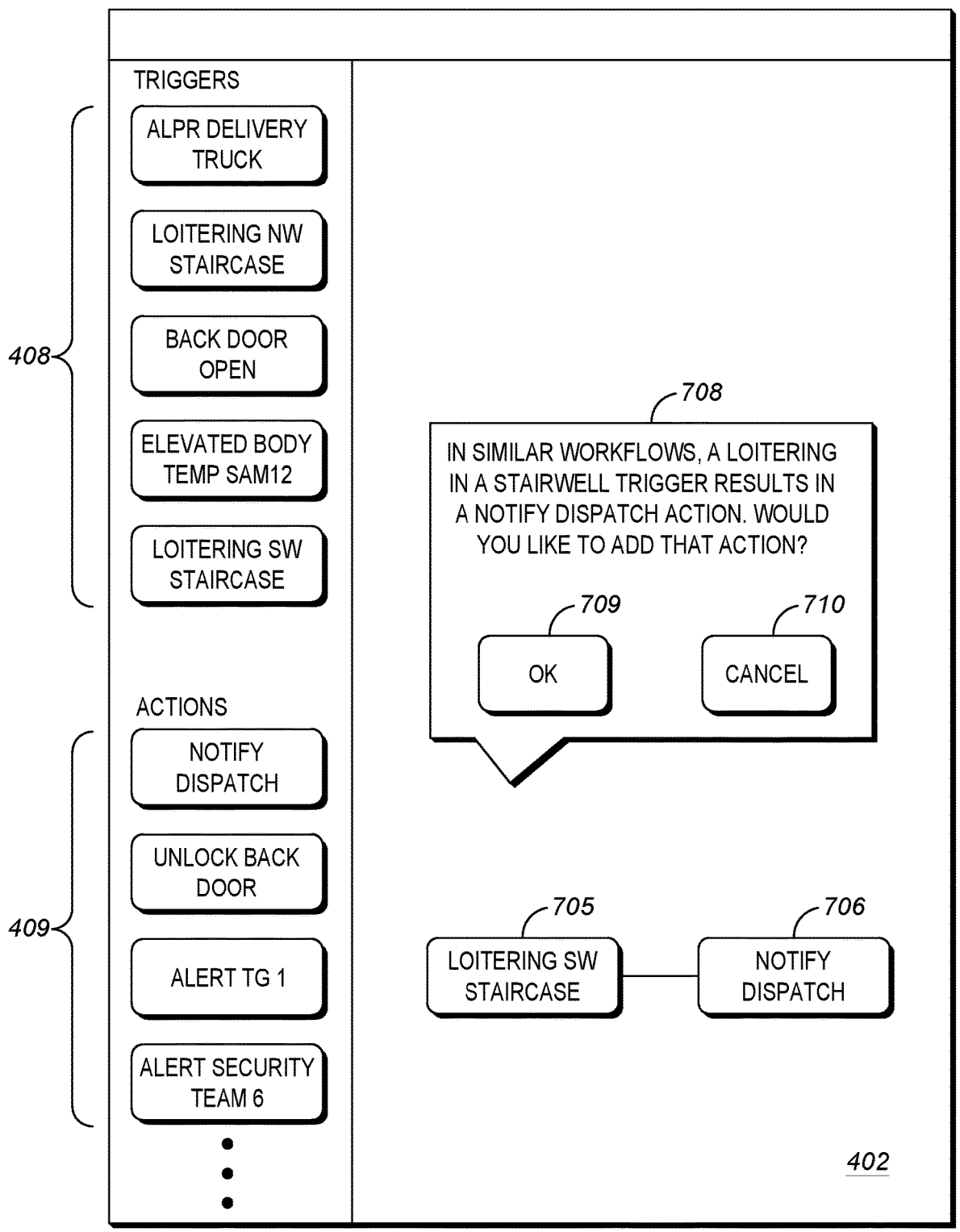
FIG. 7 illustrates an example of creation of a workflow that is adapted based on commonality with other workflows.

FIG. 7 illustrates an example of creation of a workflow that is adapted based on commonality with other workflows. A user may create a new trigger related to detecting a person loitering in the southwest (SW) staircase. The new trigger may be created and stored along with the other triggers 408. The user may then attempt to create a workflow associated with the loitering in the SW staircase by dragging the trigger 705 into the workspace 402. As explained above, the trigger could be generated by a sensor in the network. In this case, the type of sensor may be similar to the sensor described with respect to the loitering in the NW staircase trigger 605.

The system may then determine if the workflow that is being created by the user has any similarities to previously created workflows. For example, this comparison may be done via a similarity threshold or similarity score. If the system finds a workflow that is sufficiently similar, the system may determine a feature from the previously created workflow and suggest that the user include the feature in the workflow that is currently being created.

In the example, shown in FIG. 7, trigger 705, loitering SW staircase is very similar to trigger 605 loitering in NW staircase. The system may determine that the workflow that is being created is similar to the one described with respect to FIG. 6. In the workflow shown in FIG. 6, the trigger 605 loitering in the NW staircase results in action 606 notify dispatch.

Because the system has detected similarities between the two workflows, the system may suggest that the same action that was taken in response to the trigger 605 also be taken in response to trigger 705. As shown in FIG. 7, the user may be notified that a similar workflow has been found. For example, the system may prompt the user via a user interface such as a dialog box 708, by outputting, "in similar workflows, a loitering in a stairwell trigger results in a notify dispatch action. Would you like to add that action?" as shown in FIG. 7. The user may be given an "OK" option 709 to add the same trigger to the workflow that is being created and a "Cancel" option 710 to reject the suggestion. If the user selects the "OK" option, the action to notify dispatch 706 may be automatically included in the workspace and associated with the loitering trigger 705. By providing a suggestion based on existing workflows, the user is relieved of the burden of determining on their own which action from all available actions to take.

Figure 8:
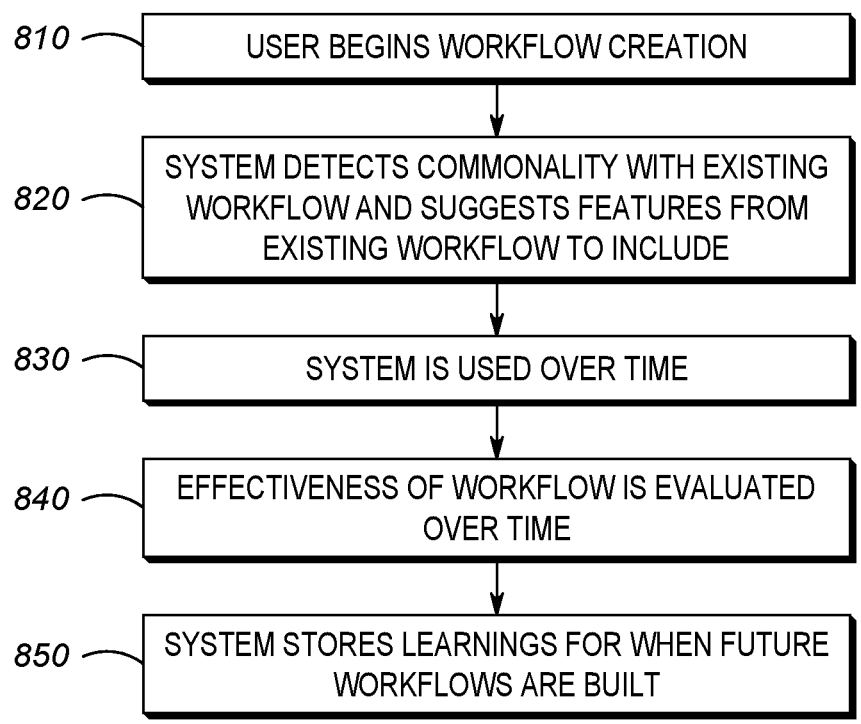
FIG. 8 is an example of a flow chart for receiving a recommendation and monitoring the effectiveness of that recommendation.

FIG. 8 is an example of a flow chart 800 for receiving a recommendation and monitoring the effectiveness of that recommendation. In block 810, the user begins the creation of a workflow. As described above, the creation of the workflow may involve dragging actions and/or triggers from the selection pane 401 of the user interface into the workspace 402 of the user interface. From there, connections between the actions and/or triggers can be established, and the workflow eventually deployed to the workflow server.

In block 820, the system detects commonality with existing workflow and suggests features from existing workflow to include. Detecting commonalities is described in further detail below. It should be noted that in some implementations, detecting commonalities between workflows is limited to workflows within the enterprise. However, for other implementations, specifically those which may include a workflow server that is provided as part of a service that provides a security ecosystem to many different enterprises, the available workflow may come from any number of different enterprises. Thus suggestions may include "best practices" from all available workflows, not just those created within a single enterprise.

A feature may be an action or a trigger. In addition, some actions and/or triggers may have associated parameters that may cause additional workflows to be initiated. For example, an action requesting the response of security personnel may have a timeout value that indicates if security personnel have not responded within the designated time period, an escalation workflow should be initiated. For example, if a loitering trigger requires a security response within 3 minutes, and the response has not been completed within that time, an escalation workflow may be initiated to take other actions (e.g. lock all doors, etc.). What should be understood is that a feature can be any part of a workflow.

In block 830, the system is used over time. As triggers are received that cause the created workflow to be initiated, the actions associated with that workflow are executed. It should be understood that although depicted as a single box associated with the workflow that was created in block 810, the system being used over time actually depicts all workflows within the system being used over time. It should be understood that this could mean all workflows within a single enterprise or multiple enterprises. What should be understood is that the system is monitoring all available workflows.

In block 840, the effectiveness of each of the workflows is monitored. Effectiveness is essentially a determination of how well the workflow performs. For example, if a workflow is constantly timing out and triggering an escalation workflow, the workflow may not be effective (e.g. timeout value too small, etc.). If the action specified by a certain trigger does not resolve the trigger, the workflow may be ineffective. If the action causes other workflows to unintentionally be initiated, the workflow may be ineffective. What should be understood is that an ineffective workflow is one that generally does not achieve its desired outcome.

In block 850, system stores the effectiveness learning for when future workflows are built. Ineffective workflows may be removed from the suggestions provided in block 820. For example, the system may detect a workflow that is very similar to one being created in blocks 810 and 820. However, the effectiveness of the similar workflow may be evaluated to determine if a suggestion to include features of the similar workflow should be made. As should be clear, if a workflow is ineffective, it does not matter if a newly created workflow is similar, as it would not be desirable to potentially cause the newly created workflow to also be ineffective. In some cases, if multiple workflows are identified as being similar to the workflow being created, features from the workflows with greater effectiveness may be suggested, rather than those from workflows with less effectiveness.

Figure 9A:
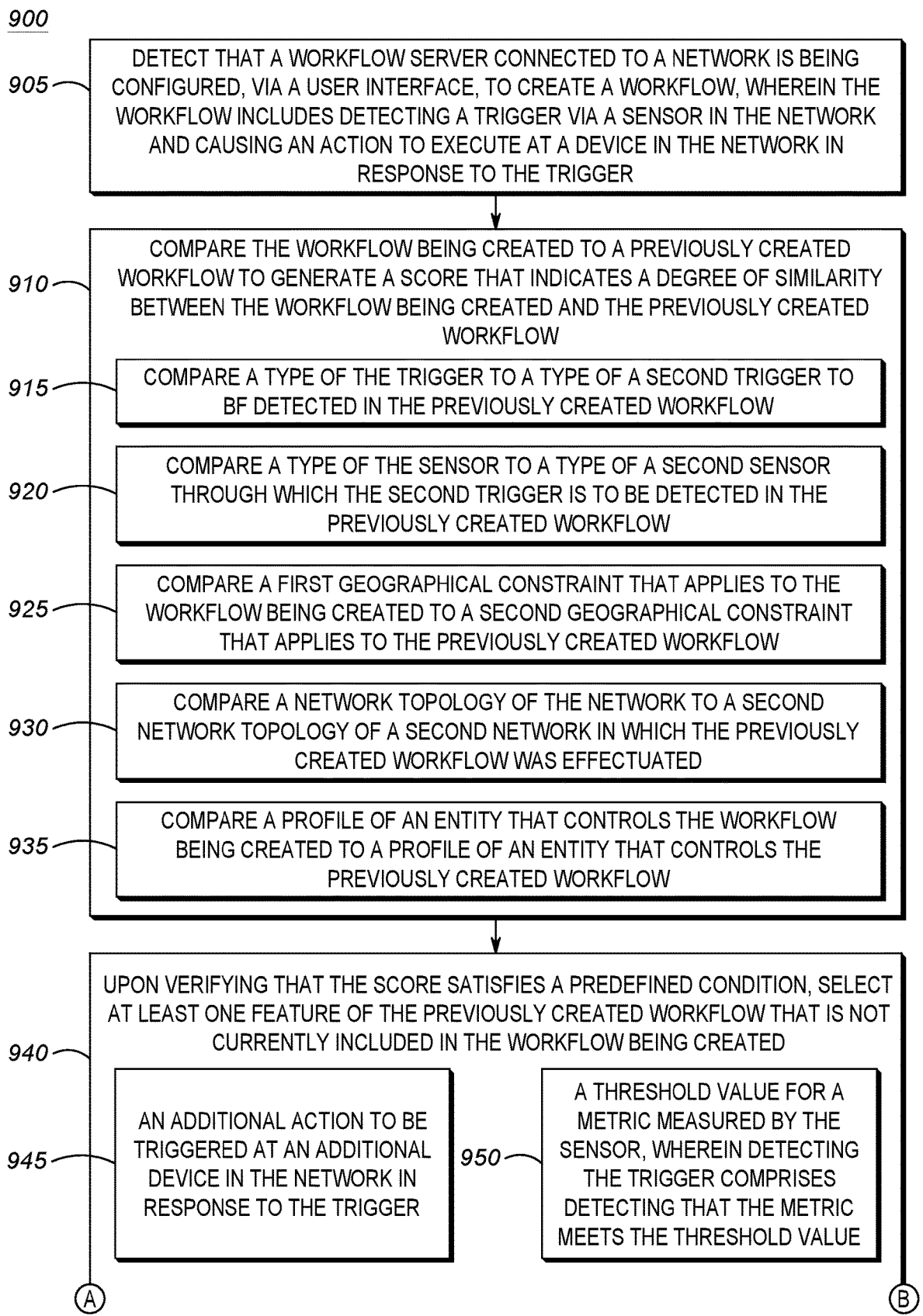
FIGS. 9A and 9B are an example of a flow chart for an implementation of the techniques described herein.
Figure 9B:
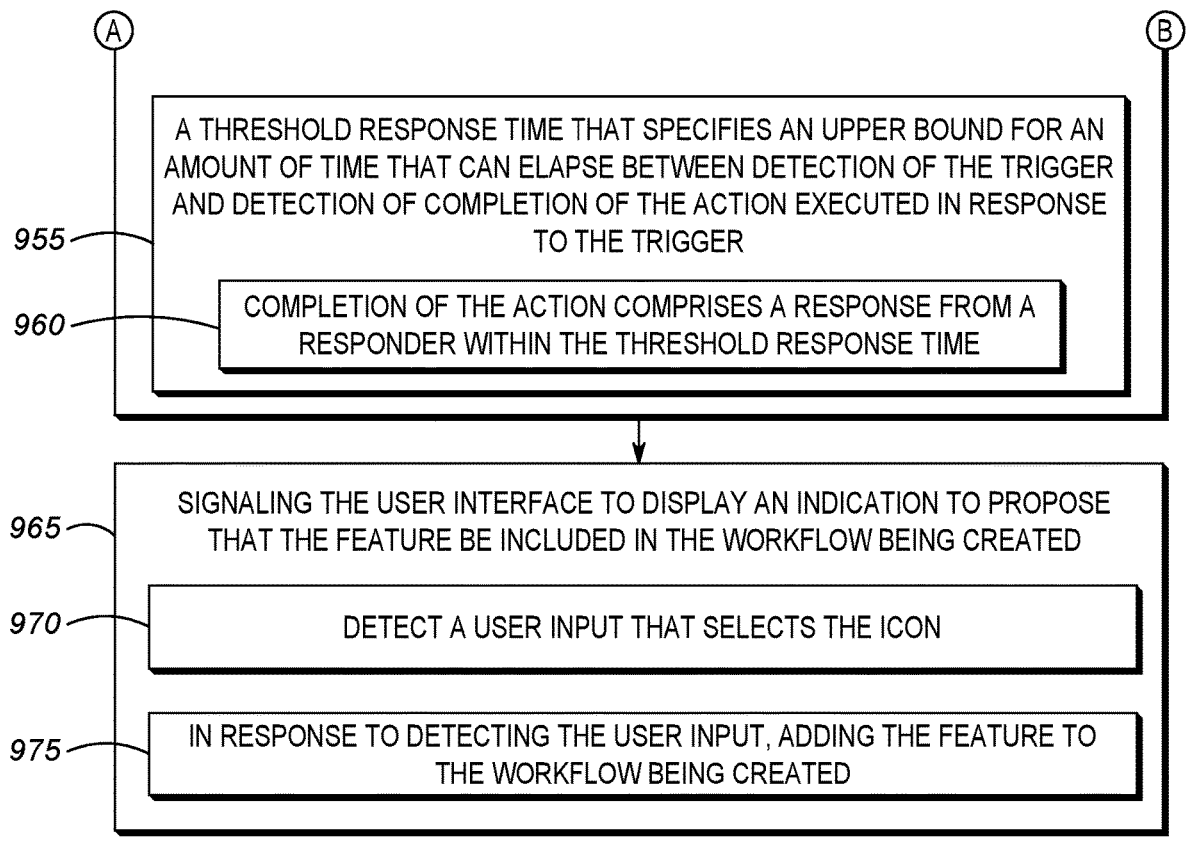

FIGS. 9A and 9B are an example of a flow chart 900 for an implementation of the techniques described herein. In block 905, it may be detected that a workflow server connected to a network is being configured vi a user interface to create a workflow. The workflow may include detecting a trigger via a sensor in the network and causing an action to execute at a device in the network in response to the trigger. As explained above, a workflow may be created by dragging actions and/or triggers from the selection pane 401 to the workspace 402. The actions and triggers may be associated with various sensors and the inputs from those sensors may be coupled to a workflow server. The workstation 101 may be used by the user to create the workflow.

In block 910, the workflow being created may be compared to a previously created workflow to generate a score that indicates a degree of similarity between the workflow being created and the previously created workflow. The techniques described herein are not dependent on any particular mechanism for generating the score, so long as it determines a level of similarity between workflows. What should be understood is that the score determines how similar the workflows are.

In block 915, the score is generated by comparing a type of trigger to a type of second trigger to be detected in a previously created workflow. For example, if the trigger type in the workflow being created is a detect loitering trigger, other workflows that include loitering detection would have similar trigger types (e.g. loitering detection, etc.). A trigger type may be triggers that are generally used to detect the same general type of activity.

In block 920, the score is generated by comparing a type of the sensor to a type of a second sensor through which the second trigger is to be detected in the previously created workflow. For example, if the trigger in the workflow being created uses sensors from a video surveillance system (e.g. cameras, etc.) then other previously created workflows which use video sensors to detect a trigger would use similar sensor types.

In block 925, the score is generated by comparing a first geographical constraint that applies to the workflow being created to a second geographical constraint that applies to the previously created workflow. For example, if the workflow being created relates to a school (e.g. a geographical constraint) then previously created workflows that also relate to schools (e.g. same geographical constraint) would be similar. The geographical constraints could also apply to actual geographic locations. For example, workflows related to a particular venue, such as a stadium could be considered similar to previously created workflows for that same venue.

In block 930, the score is generated by comparing a network topology of the network to a second network topology of a second network in which the previous created workflow was effectuated. As was explained with respect to FIG. 1, the sensors and systems that are integrated with the workflow server have a topology. Previously created workflows for a given network topology may be considered similar to workflows being created for a similar network topology. For example, consider a workflow being created for a shopping mall. It is expected that other shopping malls would be configured with a security ecosystem that is similar in topology. As such, previously created workflows for a shopping mall may be applicable to the workflow that is currently being created.

In block 935, the score is generated by comparing a profile of an entity that controls the workflow being created to a profile of an entity that controls the previously created workflow. In other words, enterprises that have similar characteristic profiles would like have workflows that are similar. For example, in the case of a workflow that is being created for a shopping mall entity, other entities that also have workflows associated with shopping malls would potentially be similar.

Although blocks 915-935 describe several different factors that may be used when generating a score to determine the degree of similarity between the workflow being created and previously existing workflows, this is solely for the purpose of explanation and is not intended to be an exhaustive list. Any techniques that are able to determine similarity between workflows could be utilized in accordance with the techniques described herein. What should be understood is that a score is generated to determine how similar a workflow that is being created is to a previously existing workflow.

In block 940, upon verifying that the score satisfies a predefined a predefined condition, at least one feature from the previously created workflow that is not currently included in the workflow being created may be selected. The predefined condition may be some condition that determines the previously created workflow and the workflow being created are sufficiently similar. In one example, the predefined condition may be that the generated score exceeds a similarity threshold that is defined by the user. If the user wishes that the workflow being created is heavily influenced by previously existing workflows, the threshold may be set to be low, such that even features from even slightly similar workflows may be selected. On the other hand, selecting a high threshold means that only features from workflows that are very similar may be selected.

In addition, only features that are not already included in the workflow being created may be selected. For example, if a workflow being created has a loitering detection trigger, and a workflow that has been determined to be similar also has a loitering trigger, the loitering trigger may not be selected (as the workflow being created already includes a loitering trigger). What should be understood is that features already included in the workflow being created will not be selected from workflows that have been determined to be similar to avoid suggestions to include a feature in the workflow being created that already exists in the workflow being created.

In block 945, the feature may comprise an additional action to be triggered at an additional device in the network in response to the trigger. For example, in the case where a similar workflow initiates an action in response to a trigger, the feature may be a suggestion to include the same action in the workflow being created. That action may cause devices in the network to be triggered in response to the action. For example, the action suggested could be to cause a door to lock. Activation of this action could cause a door within the access control system to go to a locked state.

In block 950, the feature may comprise a threshold value for a metric measured by the sensor, wherein detecting the trigger comprises detecting that the metric meets the threshold value. For example, as described above, action 604 describes an elevated body temperature. That action may have included an actual measured body temperature threshold, above which the temperature is considered elevated. The suggested feature may be to use the same threshold value that was used in a trigger from a previously created workflow that was determined to be similar to the workflow being created.

In block 955, the feature may comprise a threshold response time that specifies an upper bound for an amount of time that can elapse between detection of the trigger and detection of completion of the action executed in response to the trigger. A workflow may be initiated upon detection of a trigger. The detection may cause an action to occur. That action may have a defined amount of time for completion and if the action is not completed in that amount of time, an escalation workflow may be triggered. The feature that is suggested may be an upper bound of an amount of time for an action to complete prior to initiating an escalation workflow.

In block 960, completion of the action may comprise a response from a responder within the threshold response time. In some cases, the action that is initiated may be a physical sensor actuating, such as a door locking. In such cases, the action completion is simply the door entering into the locked state. In other cases, the action may be some sort of alert to a human responder to carry out some function (e.g. alert radio to notify security to check for loitering in the staircase, etc.). In such cases, completion of the action may be determined when the responder indicates to the workflow server that the action has been completed.

In block 965, the user interface may be signaled to display an indication to propose that the feature be included in the workflow being created. Once a feature from a similar workflow has been selected, the user may be prompted via the user interface to ask if they wish to include the feature in the workflow being created. In some cases, when the user may not necessarily be sure as to what to include in the workflow, the user may accept the suggestion. In other cases, the user may have more of a defined idea as to how they want the workflow being created to work and may decline the suggestion. What should be understood is that the user is given the option to select if the feature is included. If the user accepts the suggested feature, the feature may be added to the workflow, just as if the user had manually added the feature to the workflow.

In some implementations, the indication may be an input box, such as a text box, which includes an icon for accepting the selected feature. In block 970, user input that selects the icon may be detected from the user interface. In block 975, in response to detecting the user input, the feature may be added to the workflow being created. In other words, if the user selects the icon to include the suggested feature into the workflow being created, the feature will be added to the workflow being created automatically, just as if the user had manually added the feature to the workflow being created.

Figure 10:
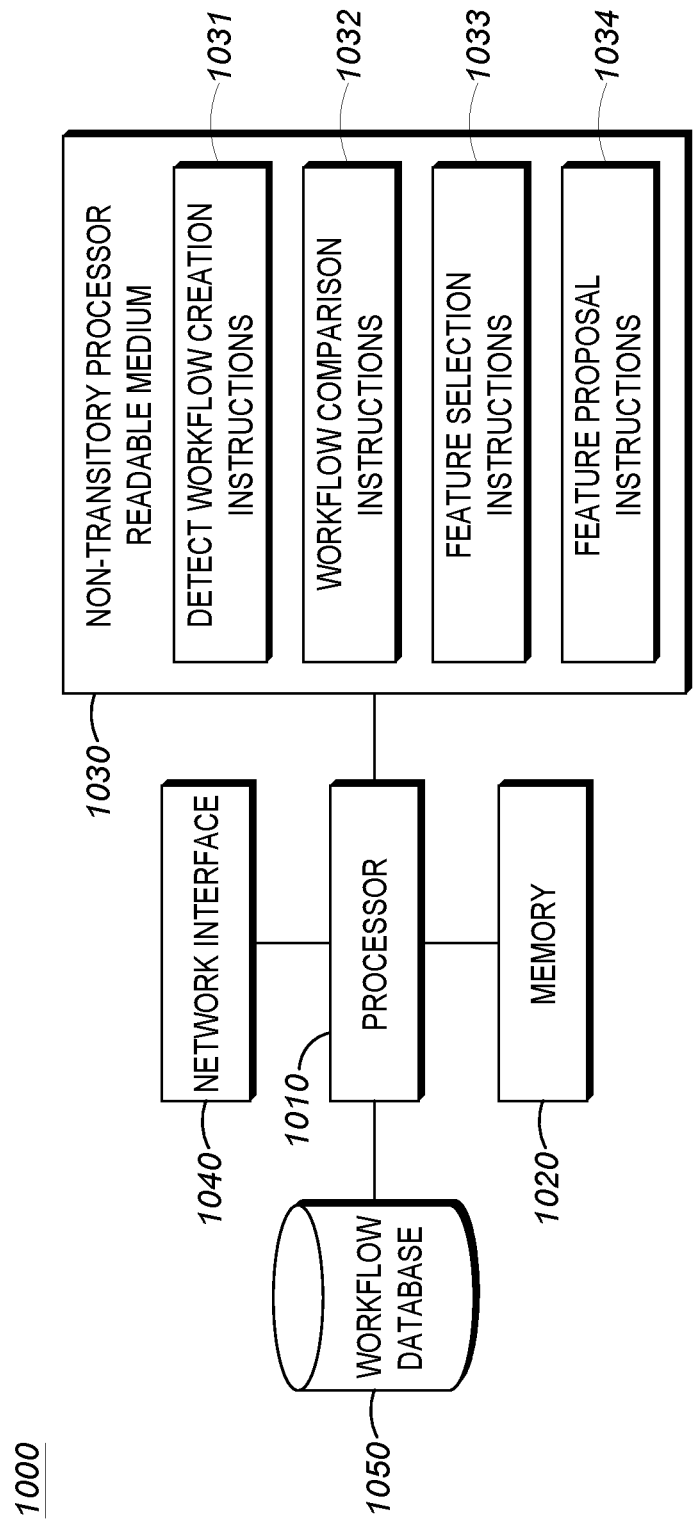
FIG. 10 is an example of a device that may implement the techniques described herein.

FIG. 10 is an example of a device 1000 that may implement the techniques described herein. For example device 1000 may implement the workflow server and/or workstation used with the techniques described herein. It should be understood that device 1000 represents one example implementation of a computing device that utilizes the techniques described herein. Although only a single processor is shown, it would be readily understood that a person of skill in the art would recognize that distributed implementations are also possible. For example, the various pieces of functionality described above (e.g. workflow creation, comparison, and proposal, etc.) could be implemented on multiple devices that are communicatively coupled. FIG. 10 is not intended to imply that all the functionality described above must be implemented on a single device.

Device 1000 may include processor 1010, memory 1020, non-transitory processor readable medium 1030, network interface 1040, and workflow database 1050.

Processor 1010 may be coupled to memory 1020. Memory 1020 may store a set of instructions that when executed by processor 1010 cause processor 1010 to implement the techniques described herein. Processor 1010 may cause memory 1020 to load a set of processor executable instructions from non-transitory processor readable medium 1030. Non-transitory processor readable medium 1030 may contain a set of instructions thereon that when executed by processor 1010 cause the processor to implement the various techniques described herein.

For example, medium 1030 may include detect workflow creation instructions 1031. The detect workflow creation instructions 1031 may cause the processor to detect creation of a new workflow at a workflow workstation. For example, the processor may utilize the network interface 1040 to determine if the user is attempting to create a new workflow. The detect workflow creation instructions 1031 are described throughout this description generally, including places such as the description of block 905.

The medium 1030 may include workflow comparison instructions 1032. The workflow comparison instructions 1032 may cause the processor to compare the workflow currently being created with previously created workflows. For example, the processor may access workflow database 1050 which stores previously created workflows to determine if any of those workflows are similar to the one being created. The workflow comparison instructions 1032 are described throughout this description generally, including places such as the description of blocks 910-935.

The medium 1030 may include feature selection instructions 1033. The feature selection instructions 1033 may cause the processor to determine that a previously created workflow is sufficiently similar to the workflow being created, and select a feature from that previously created workflow. The feature selection instructions 1033 are described throughout this description generally, including places such as the description of blocks 940-960.

The medium 1030 may include feature proposal instructions 1034. The feature proposal instructions 1034 may cause the processor to present the selected feature to the user for inclusion in the workflow that is being created. The feature proposal instructions 1034 are described throughout this description generally, including places such as the description of blocks 965-975.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
    detecting that a workflow server connected to a network is being configured, via a user interface, to create a workflow, wherein the workflow includes detecting a trigger via a sensor in the network and causing an action to execute at a device in the network in response to the trigger;
    comparing the workflow being created to a previously created workflow to generate a score that indicates a degree of similarity between the workflow being created and the previously created workflow;
    upon verifying that the score satisfies a predefined condition, selecting at least one feature of the previously created workflow that is not currently included in the workflow being created;
    signaling the user interface to display an indication to propose that the feature be included in the workflow being created, wherein the indication includes an icon;
    detecting a user input that selects the icon;
    in response to detecting the user input, adding the feature to the workflow being created;
    deploying the workflow being created to the workflow server;
    monitoring the effectiveness of the deployed workflow; and
    removing the deployed workflow from further similarity comparisons when the deployed workflow is ineffective, wherein an ineffective workflow is a workflow that does not achieve a desired outcome resulting from execution of the workflow action.

2. The method of claim 1, wherein comparing the workflow being created to a previously created workflow to generate the score comprises at least one of:
    comparing a type of the trigger to a type of a second trigger to be detected in the previously created workflow; and
    comparing a type of the sensor to a type of a second sensor through which the second trigger is to be detected in the previously created workflow.

3. The method of claim 1, wherein comparing the workflow being created to a previously created workflow to generate the score comprises:
    comparing a first geographical constraint that applies to the workflow being created to a second geographical constraint that applies to the previously created workflow.

4. The method of claim 1, wherein comparing the workflow being created to a previously created workflow to generate the score comprises:
    comparing a network topology of the network to a second network topology of a second network in which the previously created workflow was effectuated.

5. The method of claim 1, wherein comparing the workflow being created to a previously created workflow to generate the score comprises:
    comparing a profile of an entity that controls the workflow being created to a profile of an entity that controls the previously created workflow.

6. The method of claim 1, wherein the feature comprises:
    an additional action to be triggered at an additional device in the network in response to the trigger.

7. The method of claim 1, wherein the feature comprises:
    a threshold response time that specifies an upper bound for an amount of time that can elapse between detection of the trigger and detection of completion of the action executed in response to the trigger.

8. The method of claim 7 wherein completion of the action comprises:
    a response from a responder within the threshold response time.

9. The method of claim 1, wherein the feature comprises:
    a threshold value for a metric measured by the sensor, wherein detecting the trigger comprises detecting that the metric meets the threshold value.

10. A system comprising:
    a processor; and
    a memory coupled to the processor, the memory containing a set of instructions thereon that when executed by the processor cause the processor to:
        detect that a workflow server connected to a network is being configured, via a user interface, to create a workflow, wherein the workflow includes detecting a trigger via a sensor in the network and causing an action to execute at a device in the network in response to the trigger;
        compare the workflow being created to a previously created workflow to generate a score that indicates a degree of similarity between the workflow being created and the previously created workflow;
        upon verifying that the score satisfies a predefined condition, select at least one feature of the previously created workflow that is not currently included in the workflow being created;
        signal the user interface to display an indication to propose that the feature be included in the workflow being created, wherein the indication includes an icon;
        detect a user input that selects the icon;
        in response to detecting the user input, add the feature to the workflow being created;
        deploy the workflow being created to the workflow server;
        monitor the effectiveness of the deployed workflow; and
        remove the deployed workflow from further similarity comparisons when the deployed workflow is ineffective, wherein an ineffective workflow is a workflow that does not achieve a desired outcome resulting from execution of the workflow action.

11. The system of claim 10, wherein the feature comprises:
an additional action to be triggered at an additional device in the network in response to the trigger.

12. The system of claim 1, wherein the feature comprises:
a threshold response time that specifies an upper bound for an amount of time that can elapse between detection of the trigger and detection of completion of the action executed in response to the trigger.

13. The system of claim 12 wherein completion of the action comprises:
a response from a responder within the threshold response time.

14. The system of claim 10, wherein the feature comprises:
a threshold value for a metric measured by the sensor, wherein the instructions to detect the trigger further comprises instructions to detect that the metric meets the threshold value.

15. A non-transitory processor readable medium containing a set of instructions thereon that when executed by a processor cause the processor to:
detect that a workflow server connected to a network is being configured, via a user interface, to create a workflow, wherein the workflow includes detecting a trigger via a sensor in the network and causing an action to execute at a device in the network in response to the trigger;
compare the workflow being created to a previously created workflow to generate a score that indicates a degree of similarity between the workflow being created and the previously created workflow;
upon verifying that the score satisfies a predefined condition, select at least one feature of the previously created workflow that is not currently included in the workflow being created;
signal the user interface to display an indication to propose that the feature be included in the workflow being created, wherein the indication includes an icon;
detect a user input that selects the icon;
in response to detecting the user input, add the feature to the workflow being created;
deploy the workflow being created to the workflow server;
monitor the effectiveness of the deployed workflow; and
remove the deployed workflow from further similarity comparisons when the deployed workflow is ineffective, wherein an ineffective workflow is a workflow that does not achieve a desired outcome resulting from execution of the workflow action.

16. The medium of claim 15, wherein the feature comprises:
an additional action to be triggered at an additional device in the network in response to the trigger.

17. The medium of claim 15, wherein the feature comprises:
a threshold response time that specifies an upper bound for an amount of time that can elapse between detection of the trigger and detection of completion of the action executed in response to the trigger.

18. The medium of claim 17 wherein completion of the action comprises:
a response from a responder within the threshold response time.

19. The medium of claim 15, wherein the feature comprises:
a threshold value for a metric measured by the sensor, wherein the instructions to detect the trigger further comprises instructions to detect that the metric meets the threshold value.

* * * * *